US008155432B2

(12) United States Patent
Ueno

(10) Patent No.: US 8,155,432 B2
(45) Date of Patent: Apr. 10, 2012

(54) PHOTOGRAPHING APPARATUS

(75) Inventor: Toshiharu Ueno, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1140 days.

(21) Appl. No.: 11/987,340

(22) Filed: Nov. 29, 2007

(65) Prior Publication Data

US 2008/0131107 A1    Jun. 5, 2008

(30) Foreign Application Priority Data

Dec. 1, 2006  (JP) .................................. 2006-326068

(51) Int. Cl.
*G06K 9/00* (2006.01)
(52) U.S. Cl. ........... 382/154; 348/E7.004; 348/E13.008; 348/E13.015; 345/419; 345/520
(58) Field of Classification Search ................ 382/154; 348/27.004, E13.008, E13.015; 345/419, 345/520
See application file for complete search history.

(56) References Cited

U.S. PATENT DOCUMENTS

2003/0007680 A1* 1/2003 Iijima et al. .................. 382/154

FOREIGN PATENT DOCUMENTS

| JP | 6-105339 A | 4/1994 |
| JP | 8-111874 A | 4/1996 |
| JP | 11-341522 A | 12/1999 |
| JP | 11-352568 A | 12/1999 |
| JP | 2000-217022 A | 8/2000 |
| JP | 2002-034054 A | 1/2002 |
| JP | 2004-129188 A | 4/2004 |
| JP | 2005-049999 A | 2/2005 |

* cited by examiner

*Primary Examiner* — Samir Ahmed
*Assistant Examiner* — Ruiping Li
(74) *Attorney, Agent, or Firm* — Birch, Stewart, Kolasch & Birch, LLP

(57) ABSTRACT

Photographing apparatus having a plurality of photographic optical systems, comprises: an attitude detecting device which detects an attitude of the apparatus body; a physical relationship information obtaining device which obtains information on physical relationship among the photographic optical systems setting; and a shooting direction information obtaining device which obtains information on the shooting direction of each of the photographic optical systems. The images photographed by each of the photographic optical systems may be corrected based on information on the attitude of the apparatus body, information on the physical relationship among the photographic optical systems, and information on the shooting direction of each of the photographic optical systems. Thereby it enables to easily correct tilt and the like of the images.

20 Claims, 16 Drawing Sheets

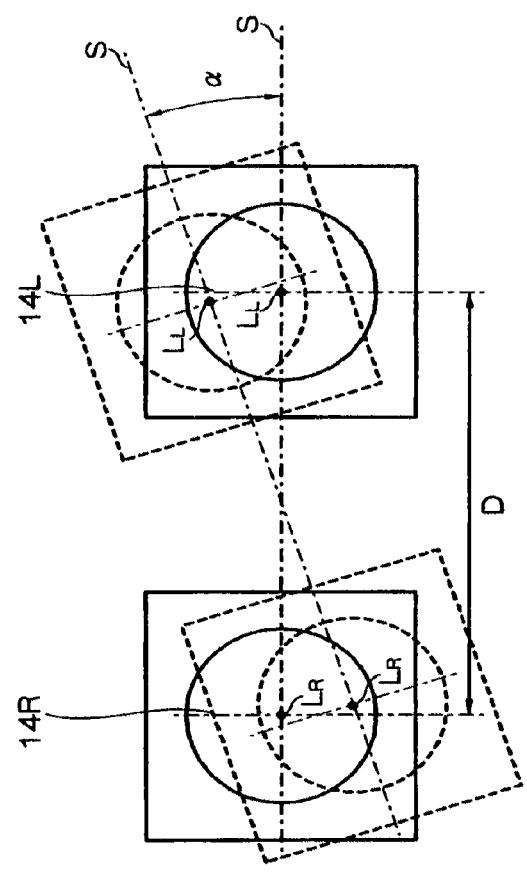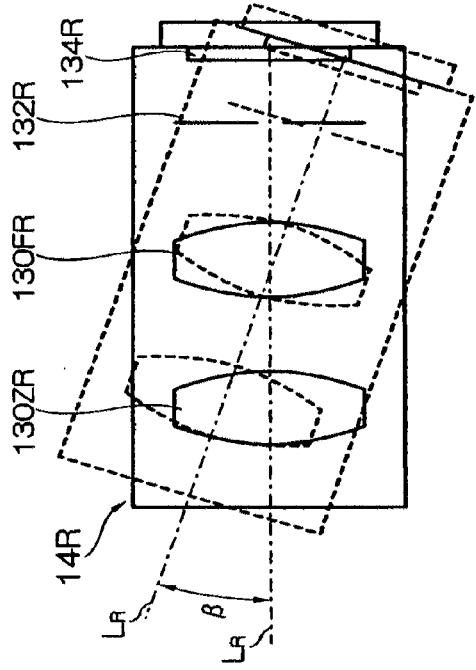
FIG.5A
FIG.5B

LEFT IMAGE          RIGHT IMAGE

ROTATE IMAGE

TRIMMING

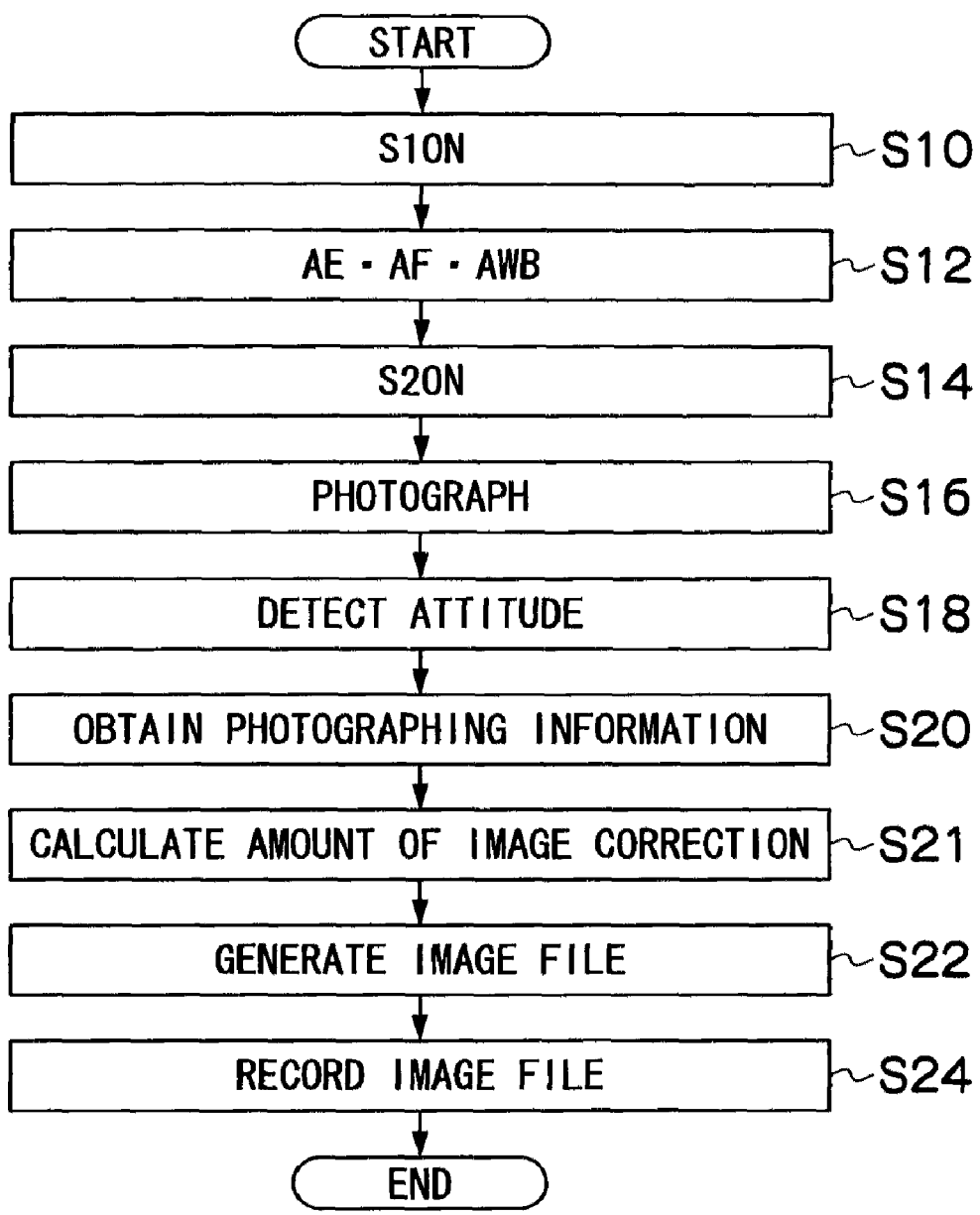

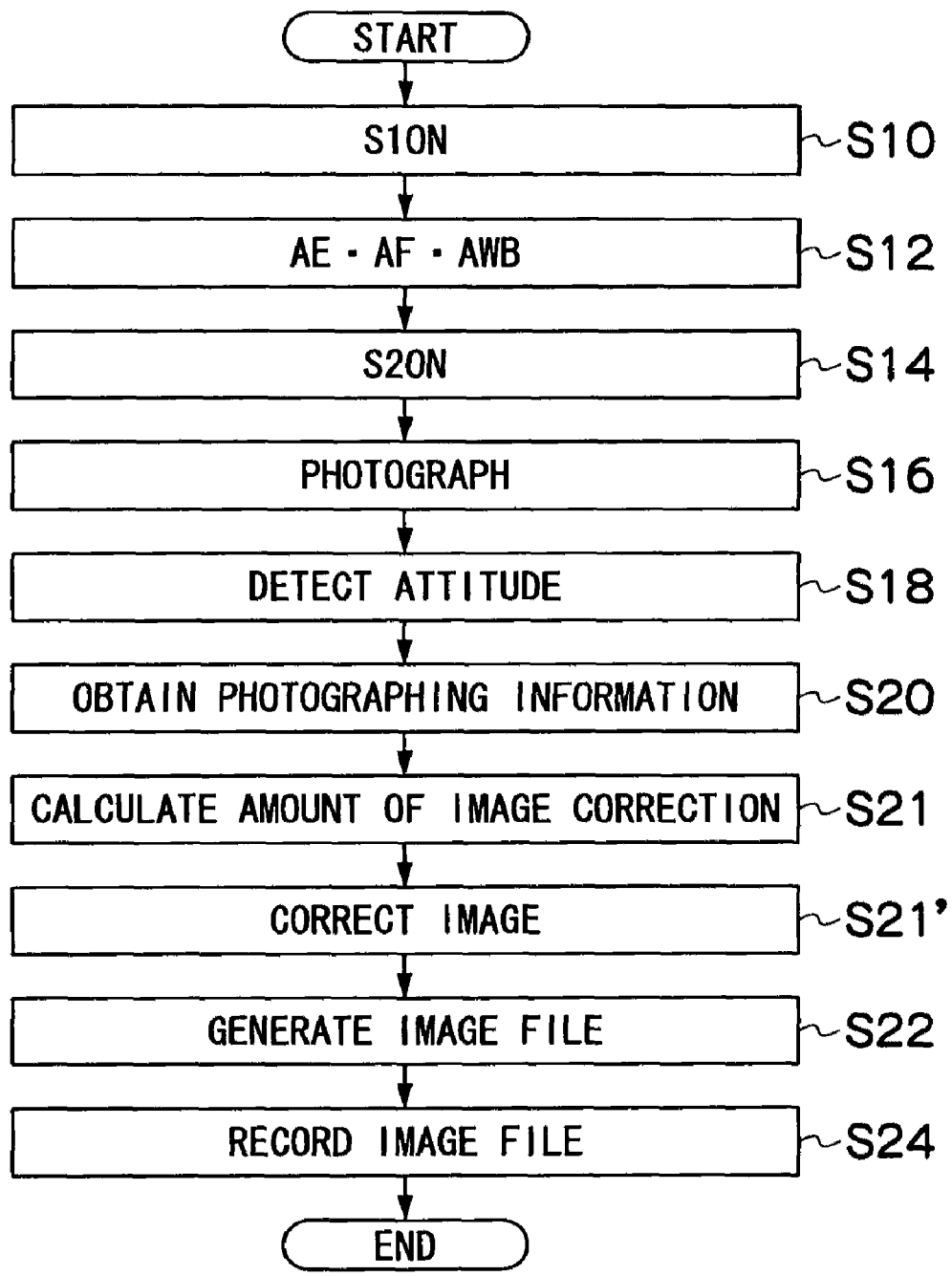

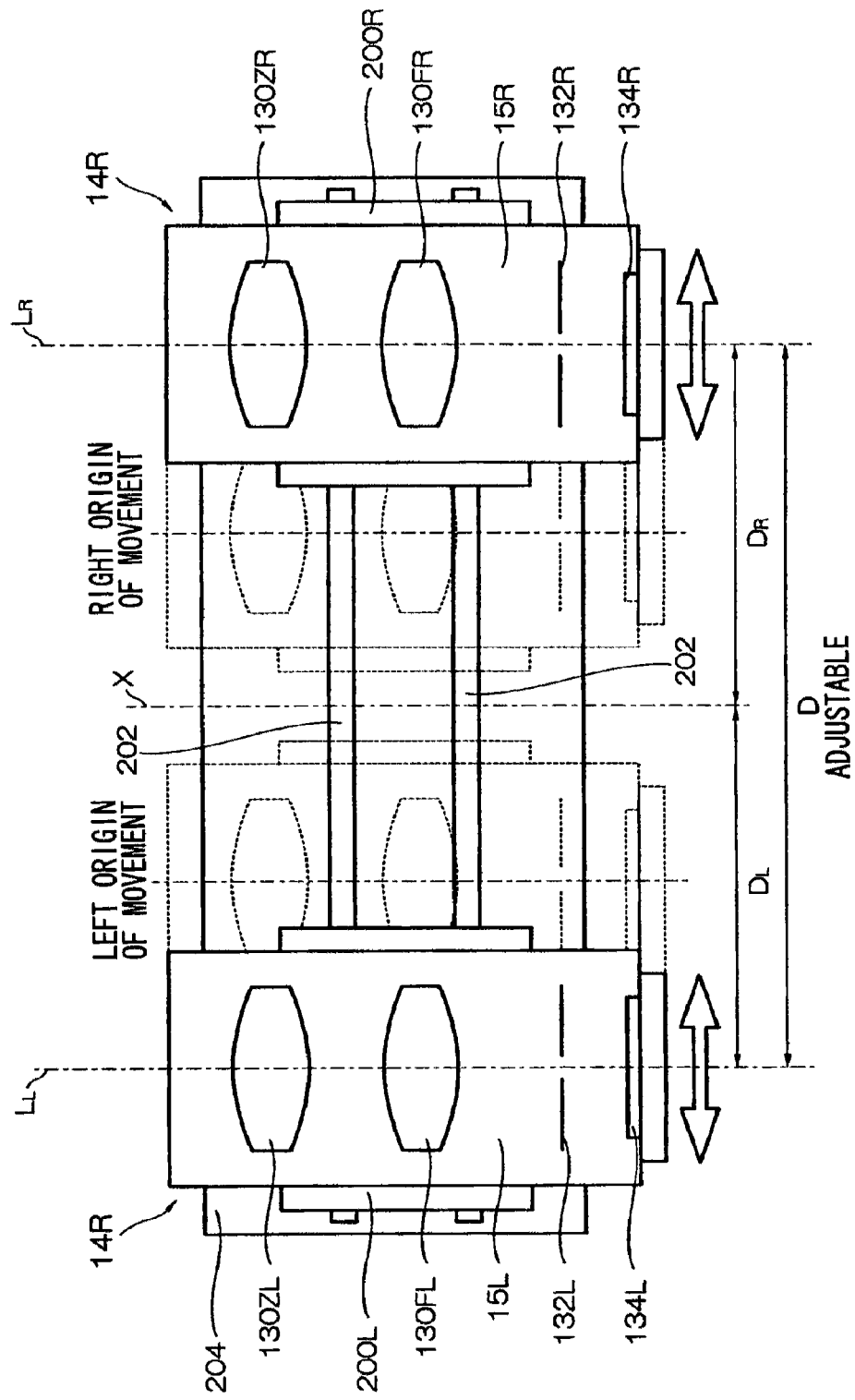

PHOTOGRAPHING APPARATUS

BACKGROUND OF THE INVENTION

1. Field of the Invention

The present invention relates to photographing apparatus, specifically to photographing apparatus for photographing a stereographic image.

2. Description of the Related Art

Generally, a stereographic image is photographed in such a manner as the same subject is photographed from two or more viewpoints at the same time. For that purpose, a camera for photographing a stereographic image (hereinafter referred to as a three-dimensional (3D) camera) is provided with two or more photographing devices (for example, see Japanese Patent Application Laid-Open No. H6-105339, No. H8-111874, and No. H1-341522).

When a photographer takes a stereographic image with the 3D camera, the photographer needs to photograph a subject so that the image is taken along a line that matches the eye level of a viewer of the photographed image. Specifically, when a photographer is to photograph a stereographic image with two photographing devices, the photographer needs to photograph a subject so that a straight line which connects the optical axes of the two photographing devices is parallel to a straight line which connects the eyes of a viewer of the photographed image. Usually, a viewer appreciates a photographed image with the horizontal visual line. Thus, the photographer needs to photograph a subject also in a way that a straight line connecting the optical axes of the two photographing devices which is photographing the subject is horizontal. If the image is taken with a tilt, the image needs to be corrected to be horizontal as required. And the correction has been manually performed by a person who is checking the tilt and the like of the image.

That manual tilt correction is very troublesome, however. It takes quite long time in correcting many images, if required.

The present invention is adapted in view of the circumstances and intends to provide photographing apparatus that produces a high quality stereographic image.

SUMMARY OF THE INVENTION

In order to achieve the intention, the first aspect of the present invention provides photographing apparatus that can photograph a stereographic image having a plurality of photographic optical systems set at predetermined positions of the apparatus body with their shooting directions fixed, comprising: an attitude detecting device which detects an attitude of the apparatus body; a physical relationship information obtaining device which obtains information on physical relationship among the photographic optical systems setting; a shooting direction information obtaining device which obtains information on the shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, the information on the physical relationship among the photographic optical systems setting obtained from the physical relationship information obtaining device, and information on the shooting direction of each of the photographic optical systems obtained from the shooting direction information obtaining device; and a record controlling device which records the image photographed by each of the photographic optical systems on a recording medium with information on the amount of correction calculated by the correction amount calculating device added.

According to the first aspect of the present invention, when a stereographic image is photographed by two or more photographic optical systems that are set at predetermined positions in predetermined directions, an attitude of the apparatus body is detected while the photographing apparatus is photographing a subject. Then, an amount of correction for correcting an image photographed by each of the photographic optical systems to a predetermined attitude is calculated based on information on the detected attitude of the apparatus body, information on known physical relationship among the photographic optical systems setting, and information on shooting directions. If the image tilts, an amount of correction to compensate the tilt is calculated. If the image is distorted, an amount of correction to compensate the distortion is calculated. The photographed image with the information of the calculated amount of correction added is recorded on the recording medium. That allows a user to simply perform the processing including correction on a tilt of the photographed image. Accordingly, the user can obtain a high quality stereographic image in a simple manner.

In order to achieve the intention, the second aspect of the present invention provides photographing apparatus that can photograph a stereographic image having a plurality of photographic optical systems set at predetermined positions of the apparatus body with their shooting directions adjustable, comprising: an attitude detecting device which detects an attitude of the apparatus body; a physical relationship information obtaining device which obtains information on physical relationship among the photographic optical systems setting; a shooting direction detecting device which detects a shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, the information on the physical relationship among the photographic optical systems setting obtained from the physical relationship information obtaining device, and information on the shooting direction of each of the photographic optical systems obtained from the shooting direction detecting device; and a record controlling device which records image photographed by each of the photographic optical systems on a recording medium with information on the amount of correction calculated by the correction amount calculating device added.

According to the second aspect of the present invention, when a stereographic image is photographed by two or more photographic optical systems that are set at predetermined positions with their shooting directions adjustable, an attitude of the apparatus body and the shooting direction of each of the photographic optical system are detected while the photographing apparatus is photographing a subject. Then, an amount of correction for correcting an image photographed by each of the photographic optical systems to a predetermined attitude is calculated based on information on the detected attitude of the apparatus body, information on the shooting directions, and information on known physical relationship among the photographic optical systems setting. The photographed image with the information of the calculated amount of correction added is recorded on the recording medium. That allows a user to simply perform the processing including correction on a tilt of the photographed image. Accordingly, the user can obtain a high quality stereographic image in a simple manner.

In order to achieve the intention, the third aspect of the present invention provides photographing apparatus that can photograph a stereographic image having a plurality of photographic optical systems on the apparatus body with their shooting directions fixed and their setting positions adjustable, comprising: an attitude detecting device which detects an attitude of the apparatus body; a setting position detecting device which detects a setting position of each of the photographic optical systems; a shooting direction information obtaining device which obtains information on the shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, information on physical relationship among the photographic optical systems setting obtained from the setting position detecting device, and the information on the shooting direction of each of the photographic optical systems obtained from the shooting direction information obtaining device; and a record controlling device which records the image photographed by each of the photographic optical systems on a recording medium with information on the amount of correction calculated by the correction amount calculating device added.

According to the third aspect of the present invention, when a stereographic image is photographed by two or more photographic optical systems with their shooting directions fixed and setting positions adjustable, an attitude of the apparatus body and setting positions of the photographic optical systems are detected while the photographing apparatus is photographing a subject. Then, an amount of correction for correcting an image photographed by each of the photographic optical systems to a predetermined attitude is calculated based on information on the detected attitude of the apparatus body, information on physical relationship among the photographic optical systems setting, and information on the known shooting directions. The photographed image with the information of the calculated amount of correction added is recorded on the recording medium. That allows a user to simply perform the processing including correction on a tilt of the photographed image. Accordingly, the user can obtain a high quality stereographic image in a simple manner.

In order to achieve the intention, the fourth aspect of the present invention provides photographing apparatus that can photograph a stereographic image having a plurality of photographic optical systems on the apparatus body with their setting positions and shooting directions adjustable, comprising: an attitude detecting device which detects an attitude of the apparatus body; a setting position detecting device which detects a setting position of each of the photographic optical systems; a shooting direction detecting device which detects a shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, information on physical relationship among the photographic optical systems setting obtained from the setting position detecting device, and information on the shooting direction of each of the photographic optical systems obtained from the shooting direction detecting device; and a record controlling device which records the image photographed by each of the photographic optical systems on a recording medium with information on the amount of correction calculated by the correction amount calculating device added.

According to the fourth aspect of the present invention, when a stereographic image is photographed by two or more photographic optical systems with their setting positions and shooting directions adjustable, an attitude of the apparatus body and the setting positions and the shooting directions of the photographic optical systems are detected while the photographing apparatus is photographing a subject. Then, an amount of correction for correcting an image photographed by each of the photographic optical systems to a predetermined attitude is calculated based on information on the detected attitude of the apparatus body, information on physical relationship among the photographic optical systems setting, and information on the shooting directions. The photographed image with the information of the calculated amount of correction added is recorded on the recording medium. That allows a user to simply perform the processing including correction on a tilt of the photographed image. Accordingly, the user can obtain a high quality stereographic image in a simple manner.

In order to achieve the intention, the fifth aspect of the present invention provides photographing apparatus that can photograph a stereographic image having a plurality of photographic optical systems set at predetermined positions of the apparatus body with their shooting directions fixed, comprising: an attitude detecting device which detects an attitude of the apparatus body; a physical relationship information obtaining device which obtains information on physical relationship among the photographic optical systems setting; a shooting direction information obtaining device which obtains information on the shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, the information on the physical relationship among the photographic optical systems setting obtained from the physical relationship information obtaining device, and the information on the shooting direction of each of the photographic optical systems obtained from the shooting direction information obtaining device; an image correcting device which corrects the image photographed by each of the photographic optical systems based on the calculated result of the correction amount calculating device; and a record controlling device which records the image corrected by the image correcting device on a recording medium.

According to the fifth aspect of the present invention, when a stereographic image is photographed by two or more photographic optical systems that are set at predetermined positions in predetermined directions, an attitude of the apparatus body is detected while the photographing apparatus is photographing a subject. Then, an amount of correction for correcting an image photographed by each of the photographic optical systems to a predetermined attitude is calculated based on information on the detected attitude of the apparatus body, information on known physical relationship among the photographic optical systems setting, and information on the shooting directions. The image photographed by each of the photographic optical systems is corrected based on the calculated result, and recorded on the recording medium. Accordingly, the user can obtain a high quality stereographic image in a simple manner.

In order to achieve the intention, the sixth aspect of the present invention provides photographing apparatus that can photograph a stereographic image having a plurality of photographic optical systems set at predetermined positions of the apparatus body with their shooting directions adjustable, comprising: an attitude detecting device which detects an attitude of the apparatus body; a physical relationship information obtaining device which detects information on physical relationship among the photographic optical systems setting; a shooting direction detecting device which detects a shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, the information on the physical relationship among the photographic optical systems setting obtained from the physical relationship information obtaining device, and information on the shooting direction of each of the photographic optical systems obtained from the shooting direction detecting device; an image correcting device which corrects the image photographed by each of the photographic optical systems based on the calculated result of the correction amount calculating device; and a record controlling device which records the image corrected by the image correcting device on a recording medium.

According to the sixth aspect of the present invention, when a stereographic image is photographed by two or more photographic optical systems that are set at predetermined positions with their shooting directions adjustable, an attitude of the apparatus body and a shooting direction of each photographic optical system are detected while the photographing apparatus is photographing a subject. Then, an amount of correction for correcting an image photographed by each of the photographic optical systems to a predetermined attitude is calculated based on information on the detected attitude of the apparatus body, information on the shooting directions and known physical relationship among the photographic optical systems setting. The image photographed by each of the photographic optical systems is corrected based on the calculated result, and recorded on the recording medium. Accordingly, the user can obtain a high quality stereographic image in a simple manner.

In order to achieve the intention, the seventh aspect of the present invention provides photographing apparatus that can photograph a stereographic image having a plurality of photographic optical systems on the apparatus body with their shooting directions fixed and their setting positions adjustable, comprising: an attitude detecting device which detects an attitude of the apparatus body; a setting position detecting device which detects a setting position of each of the photographic optical systems; a shooting direction information obtaining device which obtains information on the shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, information on physical relationship among the photographic optical systems setting obtained from the setting position detecting device, and the information on the shooting direction of each of the photographic optical systems obtained from the shooting direction information obtaining device; an image correcting device which corrects the image photographed by each of the photographic optical systems based on the calculated result of the correction amount calculating device; and a record controlling device which records the image corrected by the image correcting device on a recording medium.

According to the seventh aspect of the present invention, when a stereographic image is photographed by two or more photographic optical systems with their setting positions fixed and their shooting directions adjustable, an attitude of the apparatus body and a setting position of each photographic optical system are detected while the photographing apparatus is photographing a subject. Then, an amount of correction for correcting an image photographed by each of the photographic optical systems to a predetermined attitude is calculated based on information on the detected attitude of the apparatus body, information on the physical relationship among the photographic optical systems setting, and information on known shooting directions. The image photographed by each of the photographic optical systems is corrected based on the calculated result, and recorded on the recording medium. Accordingly, the user can obtain a high quality stereographic image in a simple manner.

In order to achieve the intention, the eighth aspect of the present invention provides photographing apparatus that can photograph a stereographic image having a plurality of photographic optical systems on the apparatus body with their setting positions and shooting directions adjustable, comprising: an attitude detecting device which detects an attitude of the apparatus body; a setting position detecting device which detects a setting position of each of the photographic optical systems; a shooting direction detecting device which detects a shooting direction of each of the photographic optical systems; a correction amount calculating device which calculates an amount of correction for correcting an image photographed by each of the photographic optical systems to a predetermined attitude based on information on the attitude of the apparatus body obtained from the attitude detecting device, information on physical relationship among the photographic optical systems setting obtained from the setting position detecting device, and information on the shooting direction of each of the photographic optical systems obtained from the shooting direction detecting device; an image correcting device which corrects the image photographed by each of the photographic optical systems based on a calculated result of the correction amount calculating device; and a record controlling device which records the image corrected by the image correcting device on a recording medium.

According to the eighth aspect of the present invention, when a stereographic image is photographed by two or more photographic optical systems with their setting positions and shooting directions adjustable, an attitude of the apparatus body and a setting position and a shooting direction of each photographic optical system are detected while the photographing apparatus is photographing a subject. Then, an amount of correction for correcting an image photographed by each of the photographic optical systems to a predetermined attitude is calculated based on information on the detected attitude of the apparatus body, information on the physical relationship among the photographic optical systems setting, and information on shooting directions. The image photographed by each of the photographic optical systems is corrected based on the calculated result, and recorded on the recording medium. Accordingly, the user can obtain a high quality stereographic image in a simple manner.

In order to achieve the intention, the ninth aspect of the present invention provides photographing apparatus that can photograph a stereographic image having a plurality of photographic optical systems set at predetermined positions on the apparatus body with their shooting directions fixed, comprising: an attitude detecting device which detects an attitude of the apparatus body; a physical relationship information obtaining device which detects information on physical relationship among the photographic optical systems setting; a shooting direction information obtaining device which obtains information on the shooting direction of each of the photographic optical systems; and a record controlling device which records the image photographed by each of the photographic optical systems on a recording medium with information on the attitude of the apparatus body obtained from the attitude detecting device, the information on the physical relationship among the photographic optical systems setting obtained from the physical relationship information obtaining device, and the information on the shooting direction of each of the photographic optical systems obtained from the shooting direction information obtaining device added.

According to the ninth aspect of the present invention, when a stereographic image is photographed by two or more photographic optical systems that are set at predetermined positions in predetermined directions, an attitude of the apparatus body are detected while the photographing apparatus is photographing a subject. The photographed image is recorded on a recording medium with the information on the detected attitude of the apparatus body, information on known physical relationship among photographic optical systems setting, and information on the shooting directions added. That allows a user to simply obtain such information as needed in performing the processing including correction on a tilt of the photographed image. Accordingly, the user can obtain a high quality stereographic image in a simple manner.

In order to achieve the intention, the tenth aspect of the present invention provides photographing apparatus that can photograph a stereographic image having a plurality of photographic optical systems set at predetermined positions on the apparatus body with their shooting directions adjustable, comprising: an attitude detecting device which detects an attitude of the apparatus body; a physical relationship information obtaining device which obtains information on physical relationship among the photographic optical systems setting; a shooting direction detecting device which detects a shooting direction of each of the photographic optical systems; and a record controlling device which records the image photographed by each of the photographic optical systems on a recording medium with information on the attitude of the apparatus body obtained from the attitude detecting device, information on the physical relationship among the photographic optical systems setting obtained from the physical relationship information obtaining device, and information on the shooting direction of each of the photographic optical systems obtained from the shooting direction detecting device added.

According to the tenth aspect of the present invention, when a stereographic image is photographed by two or more photographic optical systems that are set at predetermined positions with their shooting directions adjustable, an attitude of the apparatus body and a shooting direction of each of the photographic optical systems are detected while the photographing apparatus is photographing a subject. The photographed image is recorded on a recording medium with the information on the detected attitude of the apparatus body, information on the shooting direction of each of the photographic optical systems, and information on known physical relationship among photographic optical systems set added. That allows a user to simply obtain such information as needed in performing the processing including correction on a tilt of the photographed image. Accordingly, the user can obtain a high quality stereographic image in a simple manner.

In order to achieve the intention, the eleventh aspect of the present invention provides photographing apparatus that can photograph a stereographic image having a plurality of photographic optical systems with their shooting directions fixed and their setting positions adjustable, comprising: an attitude detecting device which detects an attitude of the apparatus body; a setting position detecting device which detects a setting position of each of the photographic optical systems; a shooting direction information obtaining device which obtains information on the shooting direction of each of the photographic optical systems; and a record controlling device which records the image photographed by each of the photographic optical systems on a recording medium with information on the attitude of the apparatus body obtained from the attitude detecting device, information on physical relationship among the photographic optical systems setting obtained from the setting position detecting device, and information on the shooting direction of each of the photographic optical systems obtained from the shooting direction information obtaining device added.

According to the eleventh aspect of the present invention, when a stereographic image is photographed by two or more photographic optical systems with their shooting directions fixed and their setting positions adjustable, an attitude of the apparatus body and a setting position of each of the photographic optical systems are detected while the photographing apparatus is photographing a subject. The photographed image is recorded on a recording medium with the information on the detected attitude of the apparatus body, information on physical relationship among photographic optical systems setting, and information on a known shooting direction of each of the photographic optical systems added. That allows a user to simply obtain such information as needed in performing the processing including correction on a tilt of the photographed image. Accordingly, the user can obtain a high quality stereographic image in a simple manner.

In order to achieve the intention, the twelfth aspect of the present invention provides photographing apparatus that can photograph a stereographic image having a plurality of photographic optical systems on the apparatus body with their setting positions and shooting directions adjustable, comprising: an attitude detecting device which detects an attitude of the apparatus body; a setting position detecting device which detects a setting position of each of the photographic optical systems; a shooting direction detecting device which detects a shooting direction of each of the photographic optical systems; and a record controlling device which records the image photographed by each of the photographic optical systems on a recording medium with information on the attitude of the apparatus body obtained from the attitude detecting device, information on physical relationship among the photographic optical systems setting obtained from the setting position detecting device, and information on the shooting direction of each of the photographic optical systems obtained from the shooting direction detecting device added.

According to the twelfth aspect of the present invention, when a stereographic image is photographed by two or more photographic optical systems with their setting positions and shooting directions adjustable, an attitude of the apparatus body and a setting position and a shooting direction of each of the photographic optical systems are detected while the photographing apparatus is photographing a subject. The photographed image is recorded on a recording medium with the information on the detected attitude of the apparatus body, information on physical relationship among photographic optical systems setting, and information on a shooting direction of each of the photographic optical systems added. That allows a user to simply obtain such information as needed in performing the processing including correction on a tilt of the photographed image. Accordingly, the user can obtain a high quality stereographic image in a simple manner.

With the photographing apparatus according to the present invention, a user can perform the processing including tilt correction in a simple manner and simply obtain a high quality stereographic image.

BRIEF DESCRIPTION OF THE DRAWINGS

FIGS. 5A and 5B are diagrams showing a method for detecting an attitude of a camera body;

FIG. 12 is a flowchart showing photographing and recording procedures of a digital camera in a 3D still image photographing mode (when the amount of correction is recorded);

FIG. 13 is a flowchart showing photographing and recording procedures of a digital camera in a 3D still image photographing mode (when the corrected image is recorded);

FIG. 14 is a plan view showing a configuration of a substantial part of a second embodiment of the digital camera to which the present invention is applied;

DETAILED DESCRIPTION OF THE PREFERRED EMBODIMENTS

The preferred embodiments of the photographing apparatus according to the present invention will be described below with reference to the accompanying drawings.

Figure 1:
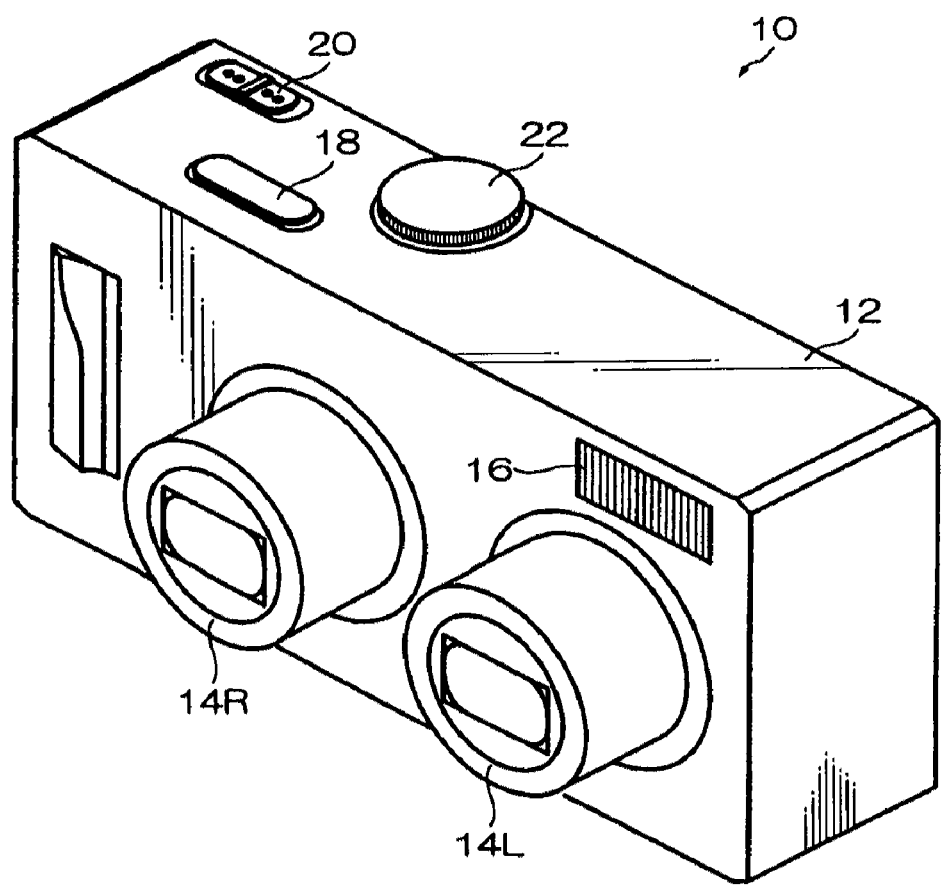
FIG. 1 is a front perspective view of an appearance of a first embodiment of a digital camera which employs the present invention.
Figure 2:
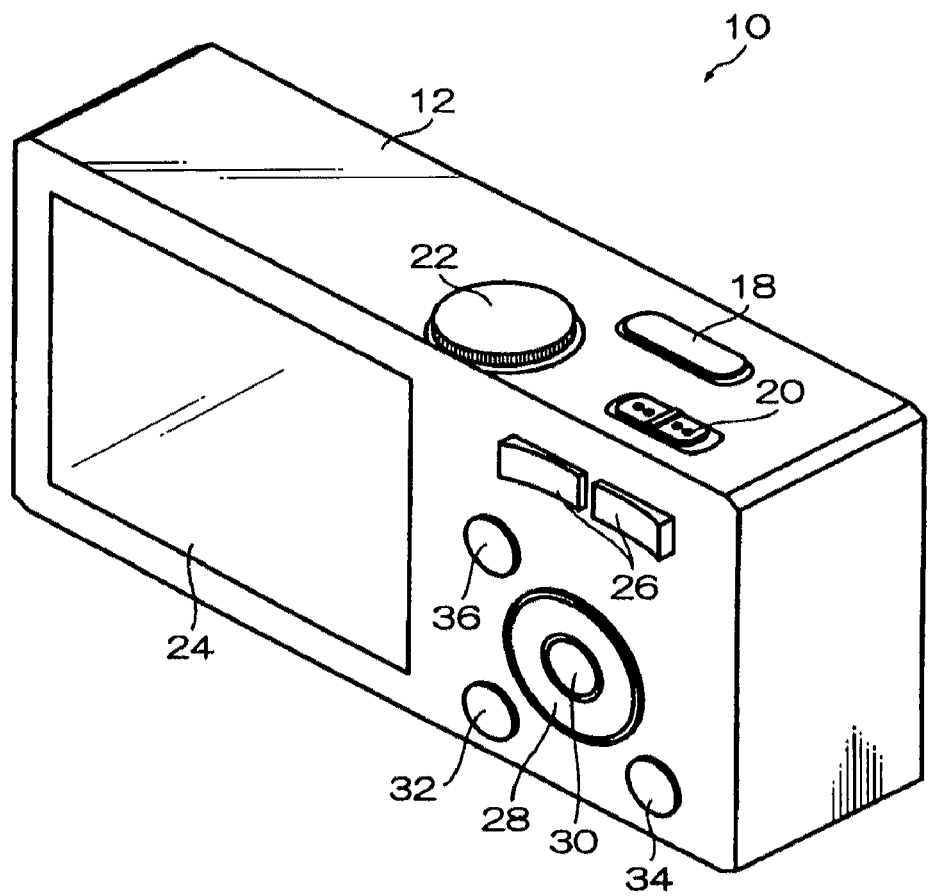
FIG. 2 is a back perspective view of an appearance of a first embodiment of a digital camera which employs the present invention.

FIGS. 1 and 2 are a front perspective view and a back perspective view of an appearance of a first embodiment of a digital camera which employs the present invention.

The digital camera 10 is adapted to photograph the same subject from two viewpoints on the left and right of the subject at the same time to produce a three-dimensional (3D) image of the subject.

The camera body (apparatus body) 12 of the digital camera 10 has a form of rectangular box with a pair of photographing lenses 14R, 14L, a flash 16 and the like provided on the front side, and a shutter button 18, a power/mode switch 20, a mode dial 22 and the like provided on the top as shown in FIG. 1.

The camera body 12 has a monitor 24, a zoom button 26, a directional button 28, a MENU/OK button 30, a DISP button 32, a BACK button 34, a macro button 36 and the like provided on the back as shown in FIG. 2.

The camera body 12 has a tripod socket, a battery cover to open and close, and the like on the bottom, though they are not shown. Inside the battery cover, a battery dock for containing batteries, a memory card slot for a memory card installed, and the like are provided.

The pair of photographing lenses on the left and right 14R and 14L is formed by collapsible zoom lenses with the same specification. When the digital camera 10 is switched on, the photographing lenses 14R and 14L come out from the camera body 12.

The zoom function and the collapsing mechanism of the photographing lens are known arts. Thus, their specific configurations are omitted from the discussion below.

The flash 16 is formed by a xenon tube and flashes as required like when a dark subject or a backlighted subject is photographed.

The shutter button 18 is formed by a two-stroke switch for 'half-depressing' and 'full-depressing'. When the shutter button 18 is half-depressed during a still image photographing mode, the digital camera 10 performs the preparation for photograph, i.e., the processing including AE (Automatic Exposure), AF (Auto Focus), and AWB (Automatic White Balance). When the shutter button 18 is fully depressed, the digital camera 10 performs photographing and recording process of an image. When the shutter button 18 is fully depressed during a moving image photographing mode, the digital camera 10 starts taking a moving image. When the shutter button 18 is fully depressed again, the digital camera 10 finishes taking the moving image. The digital camera 10 may be adapted to take a moving image while the shutter button 18 is fully-depressed and finishes taking the moving image when the shutter button 18 is released.

The power/mode switch 20 functions as a power switch of the digital camera 10 as well as a switching device which switches the mode between a playing mode and a photographing mode of the digital camera 10. The power/mode switch 20 is adapted to slide through three positions such as the 'OFF position', the 'playing position', and the 'photographing position'. When the power/mode switch 20 is placed at the 'playing position', the digital camera 10 enters into the playing mode. When the power/mode switch 20 is placed at the 'photographing position', the digital camera 10 enters into the photographing mode. When the power/mode switch 20 is placed at the 'OFF position', the digital camera 10 is switched off.

The mode dial 22 is used when the photographing mode is set. The mode dial 22 is provided on the top of the camera body 12 to be able to turn. The mode dial 22 is set at the '2D still image position', the '2D moving image position', the '3D still image position' and the '3D moving image position'. When the mode dial 22 is set to the '2D still image position', the digital camera 10 enters into the 2D still image photographing mode for photographing a plane still image (2D still image). When the mode dial 22 is set to the '2D moving image position', the digital camera 10 enters into the 2D moving image photographing mode for photographing a plane moving image (2D moving image). When the mode dial 22 is set to the '3D still image position', the digital camera 10 enters into the 3D still image photographing mode for photographing a stereographic still image (3D still image). When the mode dial 22 is set to the '3D moving image position', the digital camera 10 enters into the 3D moving image photographing mode for photographing a stereographic moving image (3D moving image).

The monitor 24 is formed by a color LCD. The monitor 24 is used as an image display unit for displaying a photographed image as well as a GUI for enabling a user to adjust various settings. The monitor is also used as an electronic finder for displaying an image captured by an image pickup device while the digital camera 10 is photographing a subject.

The zoom button 26 is used in the operation of making the photographing lenses 14R and 14L zoom in on a subject. The zoom button 26 includes a zoom TELE button for directing to make the lenses zoom in the telephotography side and a zoom WIDE button for directing to make the lenses zoom in the wide angle side.

The directional button 28 can be operated as it is pressed in the four directions of upward, downward, leftward and rightward. Each direction is allocated to a function according to a setting of the camera. For example, when the camera is photographing an object, a function for switching ON/OFF the macro function is allocated to the left button, a function for switching the flash mode is allocated to the right button, a function for changing brightness of the monitor 24 is allocated to the up button, and a function for switching ON/OFF the self timer is allocated to the down button. When the camera is playing an image, a frame-advance function is allocated to the left button, a frame-backward function is allocated to the right button, a function for changing brightness of the monitor 24 is allocated to the up button and a function for deleting an image being played is allocated to the down button. When various settings are adjusted, a function for moving a cursor displayed on the monitor 24 toward each direction of the button is allocated to each button.

The MENU/OK button 30 is used for calling a menu screen (MENU function). The MENU/OK button 30 is also used for confirming the selection, directing to exert processing (OK function) and the like. The allocated function is switched according to the setting of the digital camera 10.

On the menu screen, all the items to be adjusted for the digital camera 10 including adjustments of image quality such as an exposure value, a tint, an ISO sensitivity, and the number of recorded pixels, and setting of the self timer, switching of photometry, whether or not to use the digital zoom are set. The digital camera 10 operates according to the conditions set on the menu screen.

The DISP button 32 is used for inputting such a direction as to switch the display on the monitor 24. The BACK button 34 is used for inputting such a direction as to cancel the input operation.

The macro button 36 functions as a button for directing to switch ON/OFF the macro photographing function. Each time the macro button 36 is depressed during the photographing mode, the digital camera 10 switches ON/OFF the macro photographing function.

Figure 3:
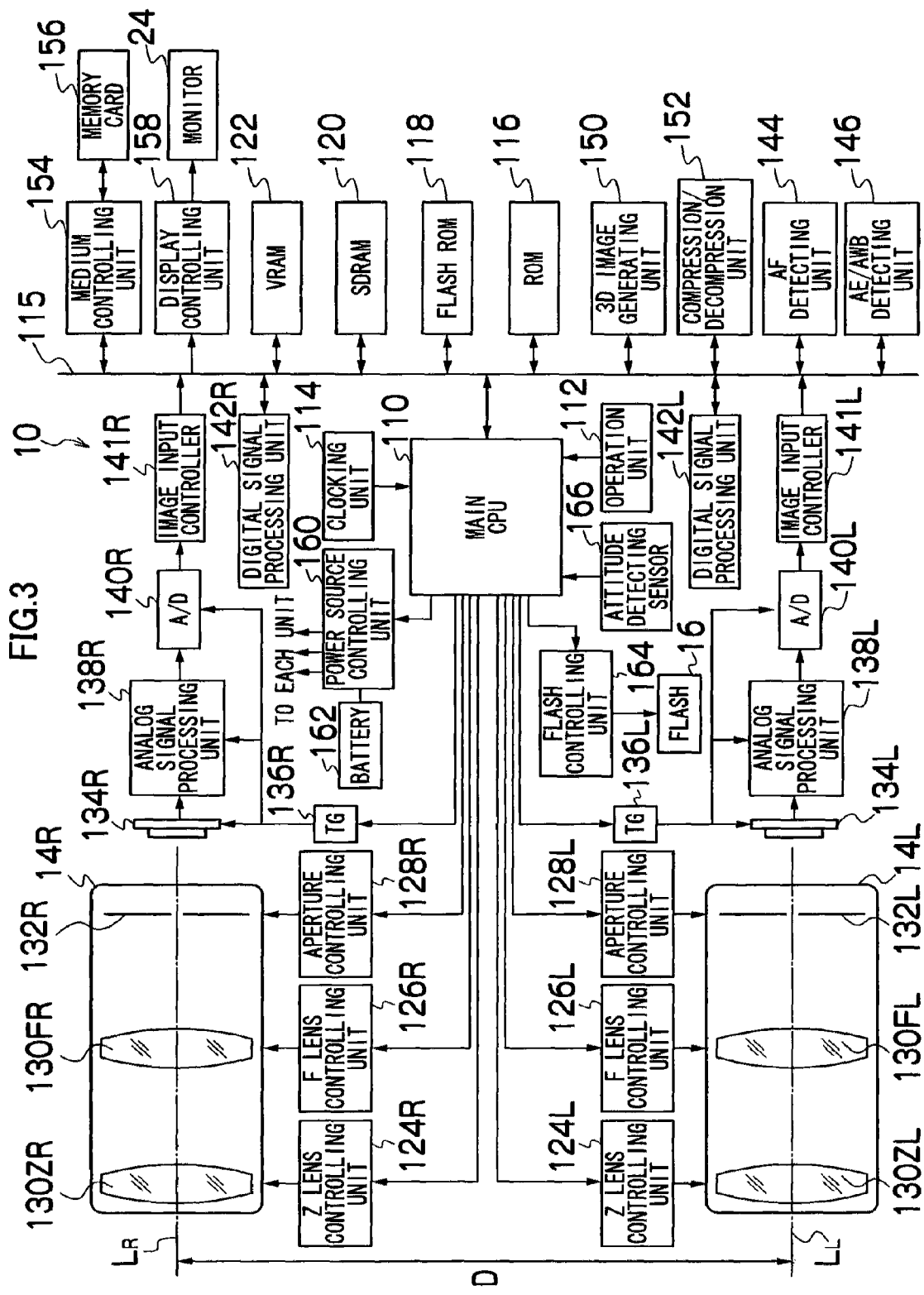
FIG. 3 is a block diagram illustrating an electrical configuration of the digital camera.

FIG. 3 is a block diagram illustrating an electrical configuration of the digital camera 10 shown in FIG. 1 and FIG. 2.

As shown in FIG. 3, the digital camera 10 according to the present embodiment is adapted to obtain two kinds of image signals from left and right for producing a three-dimensional image. The digital camera 10 includes a CPU 110, an operation unit (a shutter button 18, a power/mode switch 20, a mode dial 22, a zoom button 26, a directional button 28, a MENU/OK button 30, a DISP button 32, a BACK button 34, a macro button 36 and the like) 112, a clocking unit 114, a ROM 116, a flash ROM 118, an SDRAM 120, a VRAM 122, photographing lenses 14R and 14L, zoom lens controlling units 124R and 124L, focus lens controlling units 126R, 126L, an aperture controlling units 128R and 128L, image pickup devices 134R and 134L, timing generators (TG) 136R and 136L, an analog signal processing unit 138R and 138L, A/D converters 140R and 140L, image input controllers 141R and 141L, digital signal processing units 142R and 142L, an AF detecting unit 144, an AE/AWB detecting unit 146, a 3D image generating unit 150, a compression/decompression unit 152, a medium controlling unit 154, a memory card 156, a display controlling unit 158, a monitor 24, a power source controlling unit 160, a battery 162, a flash controlling unit 164, a flash 16, and an attitude detecting sensor 166.

The CPU 110 functions as a controlling device which controls over the operation of the camera 10 and controls each part according to a predetermined controlling program based on input from the operation unit 112.

The ROM 116 that is connected via a bus 115 is storing control programs executed by the CPU 110 and various types of data required for the control. The flash ROM 118 is storing various types of setting information and the like related to the operation of the digital camera 10 including user setting information.

The SDRAM 120 is used as a work area for calculation performed by the CPU 110 and also as a temporary recording area for image data. The VRAM 122 is used as a temporary recording area dedicated for image data to be displayed.

The clocking unit 114 clocks the current date and time and also clocks time in response to a command from the CPU 110.

The pair of photographing lenses 14R and 14L include a zoom lenses 130ZR and 130ZL, focus lenses 130FR and 130FL, apertures 132R and 132L. The photographing lenses 14R and 14L are attached to the body frame (not shown) of the camera body 12 so that their optical axes $L_R$ and $L_L$ are parallel to each other at a predetermined distance (D: base line length).

The top surface and the bottom surface of the camera body 12 are parallel to the surfaces including the optical axes $L_R$ and $L_L$ of the pair of the photographing lenses 14R and 14L. The front side and the back side of the camera body 12 are perpendicular to the optical axes $L_R$ and $L_L$. That means that when a user photographs a subject while holding the camera body 12 with the top surface horizontal, a horizontal/vertical image is produced.

A zoom actuator (not shown) drives the zoom lenses 130ZR and 130LR to move to and fro along the optical axes. The CPU 110 controls the driving of the zoom actuator via the zoom lens controlling units 124R and 124L to control the position of the zoom lenses and make the photographing lenses 14R and 14L zoom in.

A focus actuator (not shown) drives the focus lenses 130FR and 130FL to move to and fro along the optical axes. The CPU 110 controls the driving of the focus actuator via the focus lens controlling units 126R and 126L to control the position of the focus lenses and focus the photographing lenses 14R and 14L.

The apertures 132R and 132L are formed by iris apertures, for example. The apertures 132R and 132L operate as they are driven by an aperture actuator (not shown). The CPU 110 controls the driving of the aperture actuator via the aperture controlling units 128R and 128L to control the aperture amount (aperture value) of the apertures 132R and 132L and control the amount of incident light to the image pickup devices 134R and 134L.

The CPU 110 drives the zoom lenses 130ZR and 130ZL, focus lenses 130FR and 130FL, and apertures 132R and 132L which form the photographing lenses 14R and 14L by synchronizing the right and left photographing lenses 14R and 14L. Specifically, the focus is adjusted for each of the right and left photographing lenses 14R and 14L so that they are always set to the same focal length (zoom scale) and always focus on the same subject. The aperture is adjusted for each of the photographing lenses 14R and 14L so that they always have the same amount of incident light (aperture value).

Each of the image pickup devices 134R and 134L is formed by a color CCD with a predetermined color filter arrangement. The CCD has many photodiodes arranged in a two dimensional order on the photo receiving surface. The optical image of the subject formed on the photo receiving surface of the CCD by the photographing lenses 14R and 14L is converted to signal charges according to the amount of the incident light by the photodiodes. The signal charges accumulated in the respective photodiodes are serially read out from the image pickup devices 134R and 134L as voltage signals (image signals) according to the signal charges based on the driving pulse supplied from the TGs 136R and 136L in response to a command from the CPU 110.

Each of the image pickup devices 134R and 134L has an electronic shutter function. The image pickup devices control the exposure time (shutter speed) by controlling a time for accumulating charges in the photodiodes.

A CCD is used for the image pickup device in the present embodiment, but the image pickup device may have the other configuration such as a CMOS sensor.

Each of the analog signal processing units 138R and 138L includes a correlation double sampling circuit (CDS) for removing a reset noise (low frequency) contained in the image signal outputted from the image pickup devices 134R and 134L, and an AGS (Automatic Gain Switch) circuit for amplifying the image signal to be a predetermined level. Each of the analog signal processing units performs correlation double sampling on the image signals outputted from the image pickup devices 134R and 134L and also amplifies the image signals.

The A/D converters 140R and 140L convert analog image signals outputted from the analog signal processing units 138R and 138L into digital image signals.

The image input controllers 141R and 141L capture image signals outputted from the A/D converters 140R and 140L and stores them in the SDRAM 120.

The digital signal processing units 142R and 142L capture image signals stored in the SDRAM 120 according to a command from the CPU 110, perform a predetermined signal processing on them and generate image data (Y/C signal) including brightness signals Y and color-difference signals Cr and Cb. The digital signal processing units 142R and 142L also perform various types of image processing in response to commands from the CPU 110.

The AF detecting unit 144 captures image signals for respective colors of R, G, and B which have been captured from one of the image input controller 141R and calculates a focus evaluation value required for AF controlling. The AF detecting unit 144 includes a high-path filter that only passes the high frequency components of the G signals, an absolute value deriving unit, a focus area extracting unit for cutting out signals in a predetermined focus area set on a screen, and a integration unit that adds up absolute value data in the focus area. The AF detecting unit 144 outputs the absolute value data in the focus area that has been added up by the integration unit to the CPU 110 as a focus evaluation value.

When the CPU 110 controls the AF, it focuses on a main subject by searching for a position where the focus evaluation value outputted from the AF detecting unit 144 is the local maximum value, and moving the focus lenses 130FR and 130FL to the position. Specifically, when the CPU 110 controls the AF, it first moves the focus lenses 130FR and 130FL from a tight close-up position to an infinitely far position, successively obtains the focus evaluation value from the AF detecting unit 144 during the movement, and detects the position where the focus evaluation value is the local maximum. Then the CPU 110 determines that the position where the detected focus evaluation value is the local maximum is the focus position and moves the focus lenses 130FR and 130FL to the position. In the manner, the subject (main subject) placed in the focus area is focused on.

The AE/AWB detecting unit 146 captures image signals of respective colors of R, G, and B which have been captured from one of the image input controllers 141R and calculates the integrated value required for the AE control and the AWB control. Specifically, the AE/AWB detecting unit 146 divides a screen into two or more areas (for example, 8×8=64 areas) and calculates the integrated values of the R, G and B signals for each of the divided areas.

When the CPU 110 controls the AE, it obtains the integrated values of the R, G and B signals for each of the areas calculated by the AE/AWB detecting unit 146, obtains the luminous intensity (photometry value) of the subject, and performs exposure settings to obtain an appropriate amount of exposure. Specifically, the CPU 110 sets sensitivity, an aperture value, a shutter speed, and whether the flash emission is needed or not.

When the CPU 110 controls the AWB, it obtains the integrated value of the R, G, and B signals for each area calculated by the AE/AWB detecting unit 146 and calculates a gain value for adjusting white balance and detects the type of light source.

When the 3D image is being photographed (in the 3D still image photographing mode or 3D moving image photographing mode), the 3D image generating unit 150 generates image data for 3D display from the image data obtained from the two image pickup systems on the left and right.

Figure 4:
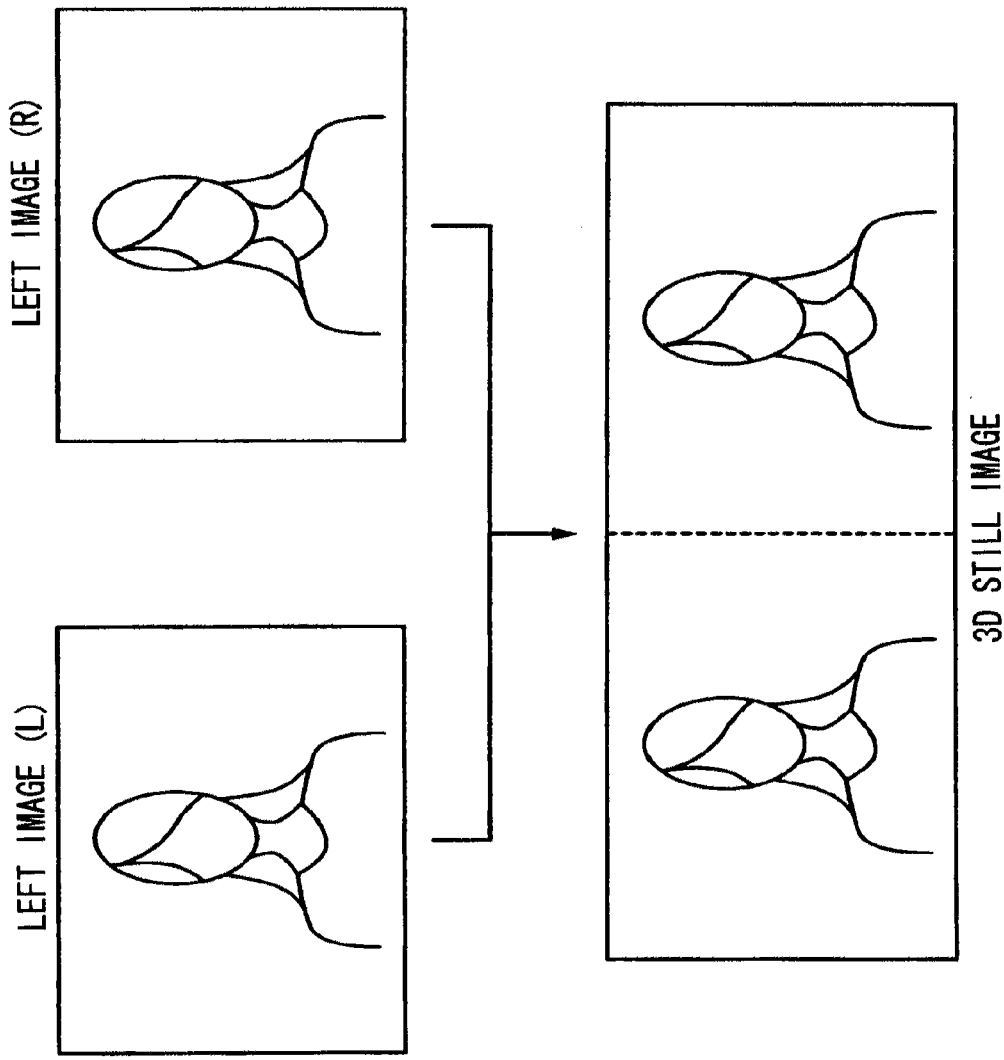
FIG. 4 is a diagram showing an example of a 3D still image.

The digital camera of the present embodiment generates an image which is formed by a left image photographed by a left side image pickup system and a right image photographed by a right image pickup system in parallel as shown in FIG. 4, and records the image as the 3D image data in the memory card 154 during the 3D still image photographing mode. In the 3D moving image photographing mode, the digital camera generates a 3D moving image in the time division system and records the image in the memory card 154.

The abovementioned type of method for generating 3D image is a known art. Thus, the specific generating method is omitted from the discussion below.

The compression/decompression unit 152 performs a predetermined form of compression on the inputted image data according to a command from the CPU 110, and generates compressed image data. The compression/decompression unit 152 performs a predetermined form of decompression on the inputted compressed image data according to a command from the CPU 110, and generates uncompressed image data.

The medium controlling unit 154 controls reading/writing of data from/to the memory card 156 according to a command from the CPU 110.

The display controlling unit 158 controls display on the monitor 24 according to a command from the CPU 110. Specifically, the display controlling unit 158 converts the inputted image signals into video signals to be displayed on the monitor 24 (for example, the NTSC signal, the PAL signal, the SCAM signal) (NTSC: National Television System Committee, P A se Alternation by Line, SCAM: Sequential Couleur A Memorie) according to a command from the CPU 110 and outputs the signals to the monitor 24. The display controlling unit 158 combines signals such as a predetermined character, graphic, and symbol with the image signal according to a command from the CPU 110, and outputs the combined signals to the monitor 24 (so called on-screen display).

The power source controlling unit 160 controls the power supply from the battery 162 to each part according to a command from the CPU 110.

The flash controlling unit 164 controls emission of the flash 16 according to a command from the CPU 110.

The attitude detecting sensor 166 detects an attitude of the camera body 12 (vertical tilt and horizontal tilt) and outputs the result to the CPU 110. Specifically, the attitude detecting sensor 166 detects a tilt α (α: alpha) of a straight line S connecting the optical axes $L_R$ and $L_L$ of a pair of photographing lenses 14R and 14L against a horizon (so called a rotation angle around the optical axis=horizontal tilt angle of the camera body 12) as shown in FIG. 5A and a tilt β (β: beta) of the optical axes $L_R$ and $L_L$ of the pair of photographing lenses 14R and 14L against a horizon (so called a vertical tilt angle of the optical axis=horizontal tilt angle of the camera body 12) as shown in FIG. 5B.

The CPU 110 records the image data obtained by the photograph to the memory card 154 with information on attitudes of the camera body 12 during the photograph obtained from the attitude detecting sensor 166 (tilts α and β).

That type of attitude detecting sensor is a known art. Thus, its specific configuration is omitted from the discussion below.

Now, operations of the digital camera 10 of the present embodiment with the abovementioned configuration will be described.

As mentioned above, the digital camera 10 of the present embodiment can perform 2D photographing and 3D photographing in response to user selection. Specifically, when the mode dial 22 is set to the 2D still image position, the digital camera enters into the 2D still image photographing mode for enabling photographing of 2D still images. When the mode dial 22 is set to the 2D moving image position, the digital camera enters into the 2D moving image photographing mode for enabling photographing of 2D moving images. When the mode dial 22 is set to the 3D still image position, the digital camera enters into the 3D still image photographing mode for enabling photographing of 3D still images. When the mode dial 22 is set to 3D moving image position, the digital camera enters into the 3D moving image photographing mode for enabling photographing of 3D moving images.

First, operations of the digital camera 10 in the 2D still image photographing mode will be described.

As mentioned above, when the mode dial 22 is set to the 2D still image position, the digital camera 10 enters into the 2D still image photographing mode and enables 2D still image photographing.

The digital camera 10 of the embodiment has two kinds of image pickup systems on the left and right for 3D photographing. When the digital camera 10 performs 2D photographing, it photographs by using only one (right) of the image pickup systems.

When the mode dial 22 is set to the 2D still image position and the power/mode switch 20 is set to the photographing position, the digital camera 10 starts in the 2D still image photographing mode.

First, the zoom actuator and the focus actuator are driven via the zoom lens controlling unit 124R and the focus lens controlling unit 126R, and the right side photographing lens 14R comes out to a predetermined photographing stand-by position (with the left side photographing lens 14L remains folded).

When the photographing lens 14R reaches the photographing stand-by position, images captured by the image pickup device 134R are displayed in live view mode on the monitor 24. Specifically, images are serially picked up by the image pickup device 134R, serially subjected to processing and the image data for live view display is generated. The generated image data is applied to the display controlling unit 158 via the VRAM 122 in order, converted into a displaying signal form and outputted to the monitor 24. As a result, the images captured by the image pickup device 134R are displayed in live view mode on the monitor 24. The photographer decides the composition by viewing the live view image on the monitor 24, and half-depresses the shutter button 18.

When the shutter button 18 is half-depressed, an S1ON signal is inputted into the CPU 110. In response to the input of the S1ON signal, the CPU 110 performs preparation for photographing, i.e., the processing including the AE, the AF, and the AWB.

First, the image signal outputted from the image pickup device 134R is applied to the AE/AWB detecting unit 146 and the AF detecting unit 144 via the analog signal processing unit 138R, the A/D converter 140R, and the image input controller 141R.

The AE/AWB detecting unit 146 calculates the integrated value required for the AE control and the AWB control from the inputted image signal, and outputs the integrated value to the CPU 110. The CPU 110 calculates the brightness of the subject based on the integrated value obtained from the AE/AWB detecting unit 146, and decides the photographing sensitivity, the aperture value, the shutter speed and the like for obtaining the appropriate exposure. The CPU 110 applies the integrated value obtained from the AE/AWB detecting unit 146 for white balance correction to the digital signal processing unit 142R.

The AF detecting unit 144 calculates the integrated value required for the AF control from the inputted image signal and outputs the integrated value to the CPU 110. The CPU controls the movement of a focus lens 130FR via the focus lens controlling unit 126R based on the output from the AF detecting unit 144 and focuses the photographing lens 14R on the main subject.

The photographer views the live view images displayed on the monitor 24, confirms the angle of view, the focus state and the like, and directs the camera to photograph. That is, the photographer fully depresses the shutter button 18.

When the shutter button 18 is fully depressed, an S2ON signal is inputted into the CPU 110. In response to the S2ON signal, the CPU 110 executes the processing of photographing.

First, the CPU 110 exposes the image pickup device 134R with the photographing sensitivity, the aperture value and the shutter speed obtained from the abovementioned AE control and picks up the image for recording.

The image signal for recording outputted from the image pickup device 134R is applied to the digital signal processing unit 142R via the analog signal processing unit 138R, the A/D converter 140R, and the image input controller 141R. The digital signal processing unit 142R generates image data (Y/C image data) including brightness data Y and color difference data Cr and Cb by performing predetermined signal processing on the inputted image signal.

The image data generated by the digital signal processing unit 142 is temporally stored in the SDRAM 120 and then applied to the compression/decompression unit 152. The compression/decompression unit 152 generates compressed image data by performing predetermined compression (here, the compression complying with the JPEG standard) on the inputted image data.

The compressed image data generated by the compression/decompression unit 152 is stored in the SDRAM 120. The CPU 110 generates an image file in a predetermined form that is the compressed image data stored in the SDRAM 120 with predetermined information added and records the image file in the memory card 156 via the medium controlling unit 154.

The generated image data may be recorded without compressed if the user selects so. In such a case, the generated image data is recorded into the memory card 156 as it is without compressed by the compression/decompression unit 152.

The image data outputted from the image pickup device 134R may be recorded as it is if the user selects so (so-called RAW data recording). In such a case, the digitized image data is recorded in the memory card 156 as it is.

Figure 6:
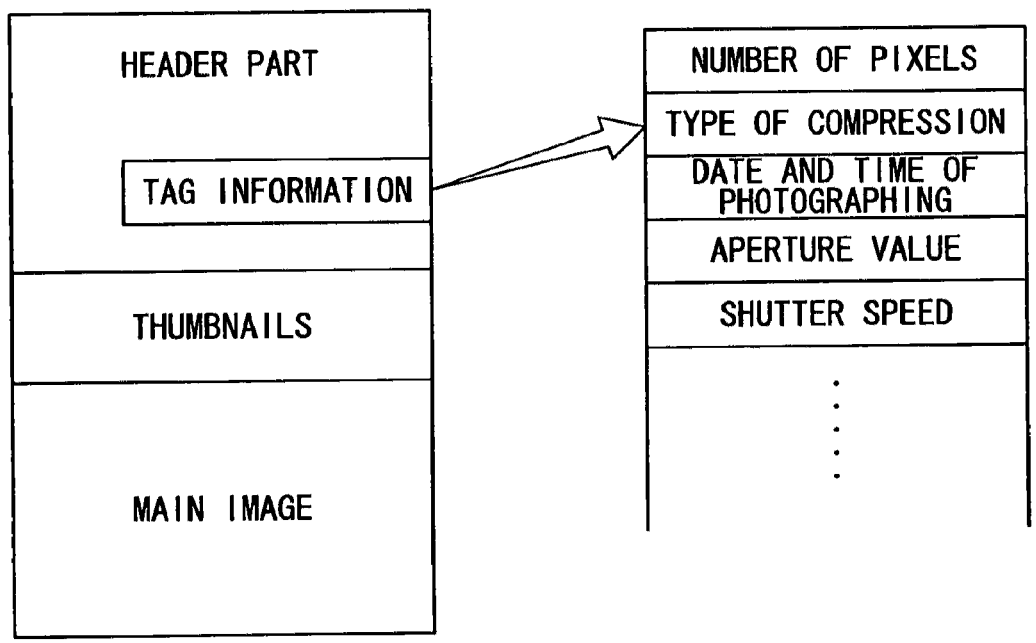
FIG. 6 is a diagram showing a structure of a file of a 2D still image.

The image file is generated such that predetermined appendix information (tag) is embedded in the top (so-called a header part) of the image data (main image) obtained by photographing and reduced image to be used in searching an image (so-called a thumbnail) is included as shown in FIG. 6. The tag information embedded in the image file includes information on an image data structure (the number of pixels, the type of compression and the like), information on features (a play gray scale curve feature, a color converting matrix factor and the like), information on date and time (date and time when an original image is generated (photographed date and time) and the like), information on the recording position, information on the photographing conditions, user information and the like. The tags related to the photographing conditions include information including attitude information on the camera body 12 (tilt angles α and β) when the digital camera is photographing as well as so-called tag information recorded in Exif (Exif: Exchangeable image file format) such as the shutter speed, the aperture value, the ISO sensitivity, the brightness value, the exposure correction value, the distance to the subject (standard/macro/background/foreground and the like), the photometry (central focus/spot/multi patterns and the like), the type of light source, the lens focal length, the flash intensity, the exposure mode (automatic/manual and the like), the white balance mode, the scaling factor of the digital zoom, the type of subject as the photographing scene type (standard/landscape/portrait/nightscape and the like), the position of the main subject in a scene, the pattern of contrast processing performed by a camera on an image while the camera is photographing (standard/soft/hard), the pattern of intensity processing performed by a camera on an image while the camera is photographing (standard/low intensity/high intensity and the like), the pattern of sharpness processing performed by a camera on an image while the camera is photographing (standard/strong/weak and the like), a degree of a feel of increasing or decreasing by the gain control (a feel of increasing/a feel of decreasing, strong/weak and the like).

The CPU 110 collects those information when the digital camera is photographing, and generates the tag information. Therefore, the attitude of the camera body 12 (tilt angles α and β) is detected by the attitude detecting sensor 166 at the same time when the digital camera is photographing.

The 2D still image has been photographed. If the user wants to keep on photographing, the user repeats the processing mentioned above.

When the mode of the digital camera 10 is set in the playing mode, the image recorded on the memory card 156 is reproduced and displayed on the monitor 24. Specifically, when the power/mode switch 20 is set to the playing position and the mode of the digital camera 10 is set to the play mode, the compressed image data of the image file that is recorded in the memory card 156 last via the medium controlling unit 154 is read out.

The compressed image data read out from the memory card 156 is applied to the compression/decompression unit 152, made into uncompressed image data, and then applied to the VRAM 122. Then, the data is outputted to the monitor 24 from the VRAM 122 via the display controlling unit 154. As a result, the image recorded in the memory card 15 is reproduced and displayed on the monitor 24.

Frame-advance of the image is performed with the right and left keys of the directional buttons 28. When the right key is pressed, the next image is read out from the memory card 156, and reproduced and displayed on the monitor 24. When the left key is pressed, the previous image is read out from the memory card 156 and played on the monitor 24.

As mentioned above, in the 2D still image photographing mode, an image is recorded when the shutter button 18 is fully-depressed.

Now, operations of the digital camera 10 in the 2D moving image photographing mode will be described.

When the mode dial 22 is set at the 2D moving image position, the digital camera 10 enters into the 2D moving image photographing mode for enabling photographing of 2D moving images as mentioned above.

The digital camera 10 performs 2D moving image photographing also by using only one (right side) of the image pickup systems.

When the mode dial 22 is set to the 2D moving image position and the power/mode switch 20 is set to the photographing position, the digital camera 10 starts in the 2D moving image photographing mode.

First, the right photographing lens 14R comes out to a predetermined photographing stand-by position, and the images captured by the image pickup device 134R are displayed in live view mode on the monitor 24.

The photographer decides the composition by viewing the live view image on the monitor 24, and directs the camera to start photographing. That is, the photographer fully depresses the shutter button 18.

When the shutter button 18 is fully depressed, an S2ON signal is inputted into the CPU 110. In response to the S2ON signal, the CPU 110 executes the processing of the 2D moving image photographing.

When a moving image is photographed, images are serially picked up at a predetermined frame rate. The images serially picked up by the image pickup device 134R are serially applied to the digital signal processing unit 142R via the analog signal processing unit 138R, the A/D converter 140R, and the image input controller 141R. The digital signal processing unit 142R serially generates image data including brightness data Y and color difference data Cr and Cb by performing predetermined signal processing on the inputted image signal.

The generated image data is serially applied to the compression/decompression unit 152, subjected to predetermined compression and then stored in the SDRAM 120 in order.

In order to finish photographing, the user fully-depresses the shutter button 18. When the shutter button 18 is fully-depressed, the S2ON signal is inputted to the CPU 110. In response to the input of the S2ON signal, the CPU 110 finishes the 2D moving image photographing.

When the photographing finishes, the CPU 110 generates an image file in a predetermined form that is the moving image data stored in the SDRAM 120 with the predetermined information added (Motion JPEG form) and records the image file in the memory card 156 via the medium controlling unit 154.

The image file is generated such that predetermined tag information related to the photographing is embedded in the top of the image data obtained by the photographing in the same manner as in the still image file.

The 2D moving image has been photographed. If the user wants to keep on photographing, the user repeats the processing mentioned above.

The moving image recorded in the memory card 156 can be played on the monitor when the mode of the digital camera 10 is set to the play mode.

In such a case, when the power/mode switch 20 is set to the playing position and the mode of the digital camera 10 is set to playing mode, an image of the top frame of the moving image is displayed on the monitor 24. If the user directs the camera to play (for example, if the user presses the MENU/OK button 30) here, the moving image data is read out from the memory card 156, subjected to predetermined playing processing and outputted to the monitor 24. As a result, the 2D moving image recorded in the memory card 156 is played on the monitor.

As mentioned above, in the 2D moving image photographing mode, when the user fully-depresses the shutter button 18, the photographing starts. When the user fully-depresses the shutter button 18 again, the photographing finishes (the camera can also be adapted to photograph a moving image while the user fully-depresses the shutter button 18 again, and when the user releases the fully-depression, the photographing finishes according to the setting).

Now, operations of the digital camera 10 in the 3D still image photographing mode will be described.

When the mode dial 22 is set at the 3D still image position, the digital camera 10 enters into the 3D still image photographing mode for enabling photographing of 3D still images. The digital camera 10 performs the 3D photographing by using the left and right image pickup systems.

When the mode dial 22 is set to the 3D still image position and the power/mode switch 20 is set to the photographing position, the digital camera 10 starts in the 3D still image photographing mode.

First, the zoom actuator and the focus actuator are driven and both of the right and left photographing lenses 14r and 14L come out to the predetermined photographing stand-by position.

Figure 7:
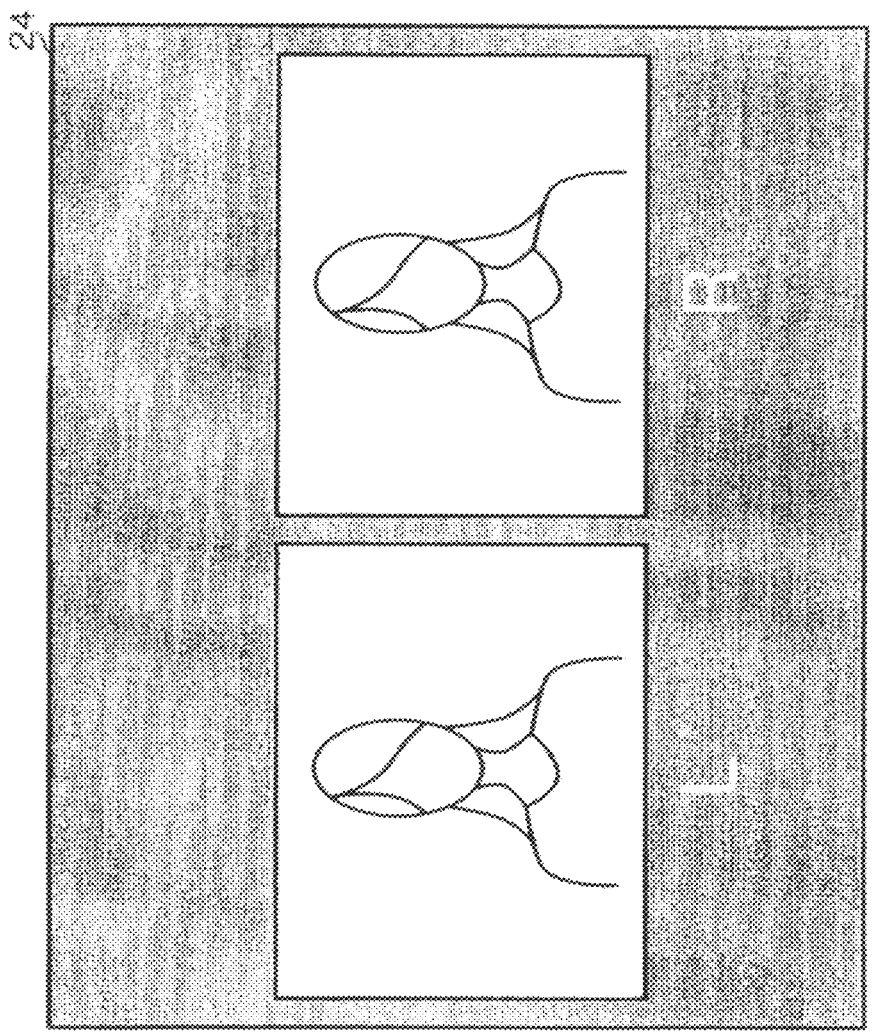
FIG. 7 is a diagram showing an example of live view display.

When the photographing lenses 14R and 14L reaches the photographing stand-by position, the images captured by the image pickup devices 134R and 134L are displayed in live view mode on the monitor 24. Specifically, the images are serially picked up by the image pickup devices 134R and 134L and serially subjected to the processing to generate the image data for live view display. The generated image data is serially applied to the display controlling unit 158 via the VRAM 122 and outputted to the monitor 24. Here, the images from both of the left and right image pickup systems are displayed on the monitor 24 in parallel as shown in FIG. 7, for example. The photographer 24 decides the composition by viewing the live view image on the monitor 24, and half-depresses the shutter button 18.

When the shutter button 18 is half-depressed, an S1ON signal is inputted into the CPU 110. In response to the input of the S1ON signal, the CPU 110 performs preparation for photographing, i.e., the processing including the AE, the AF, the AWB.

First, the image signal outputted from the image pickup device 134R is applied to the AE/AWB detecting unit 146 and the AF detecting unit 144 via the analog signal processing unit 138R, the A/D converter 140R, and the image input controller 141R.

The AE/AWB detecting unit 146 calculates the integrated value required for the AE control and the AWB control from the inputted image signal, and outputs the integrated value to the CPU 110. The CPU 110 calculates the brightness of the subject based on the integrated value obtained from the AE/AWB detecting unit 146, and decides the photographing sensitivity, the aperture value, the shutter speed and the like for obtaining the appropriate exposure. The AE/AWB detecting unit 146 applies the integrated value obtained from the AE/AWB detecting unit 46 for white balance correction to the digital signal processing unit 142R.

The AF detecting unit 144 calculates the integrated value required for the AF control from the inputted image signal and outputs the integrated value to the CPU 110. The CPU controls the movement of both of the focus lenses 130FR and 130FL in sync with each other via the focus lens controlling units 126R and 126L based on the output from the AF detecting unit 144 and focuses the photographing lenses 14R and 14L on the main subject.

The photographer views the live view images displayed on the monitor 24, confirms the angle of view, the focus state and the like, and directs the camera to photograph. That is, the photographer fully depresses the shutter button 18.

When the shutter button 18 is fully depressed, an S2ON signal is inputted into the CPU 110. In response to the S2ON signal, the CPU 110 executes the processing of photographing.

First, the CPU 110 exposes both of the left and right image pickup devices 134R and 134L with the photographing sensitivity, the aperture value and the shutter speed obtained from the abovementioned AE control and picks up the image for recording.

The image signal for recording outputted from the image pickup devices 134R and 134L are applied to the digital signal processing units 142R and 142L via the analog signal processing units 138R and 138L, the A/D converters 140R and 140L, and the image input controllers 141R and 141L. The digital signal processing units 142R and 142L generate image data (Y/C image data) including brightness data Y and color difference data Cr and Cb by performing predetermined signal processing on the inputted image signals, respectively.

The generated image data is applied to the 3D image generating unit 150. The 3D image generating unit 150 generates a predetermined 3D still image from the two series of left and right inputted still images.

As mentioned above, the digital camera of the present embodiment generates an image which is formed by a left image photographed by the left side image pickup system and a right image photographed by the right side image pickup system in parallel as a 3D still image, as shown in FIG. 4.

The generated image data for the 3D still image is temporally stored in the SDRAM 120 and then applied to the compression/decompression unit 152. The compression/decompression unit 152 generates compressed image data by performing predetermined compression on the inputted image data.

The compressed image data generated by the compression/decompression unit 152 is stored in the SDRAM 120. The CPU 110 generates an image file in a predetermined form that is the compressed image data stored in the SDRAM 120 with predetermined information added and records the image file in the memory card 156 via the medium controlling unit 154 in the same manner as for the 2D still image data.

The generated image data may be recorded without compressed if the user selects so. In such a case, the generated image data is recorded into the memory card 156 as it is without compressed by the compression/decompression unit 152.

The image data outputted from the image pickup device 134R and 134L may be recorded as it is if the user selects so (so-called RAW data recording). In such a case, the digitized image data is recorded in the memory card 156 as it is.

Figure 8:
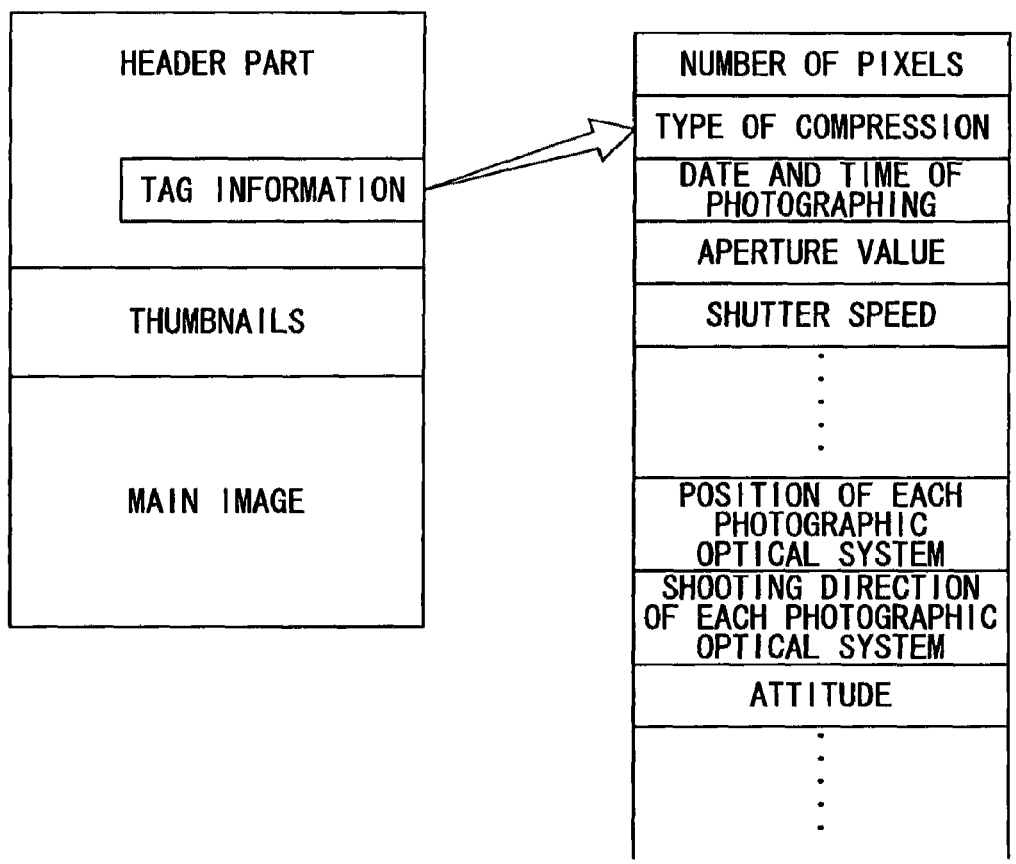
FIG. 8 is a diagram showing a structure of a file of a 3D still image.
Figure 9:
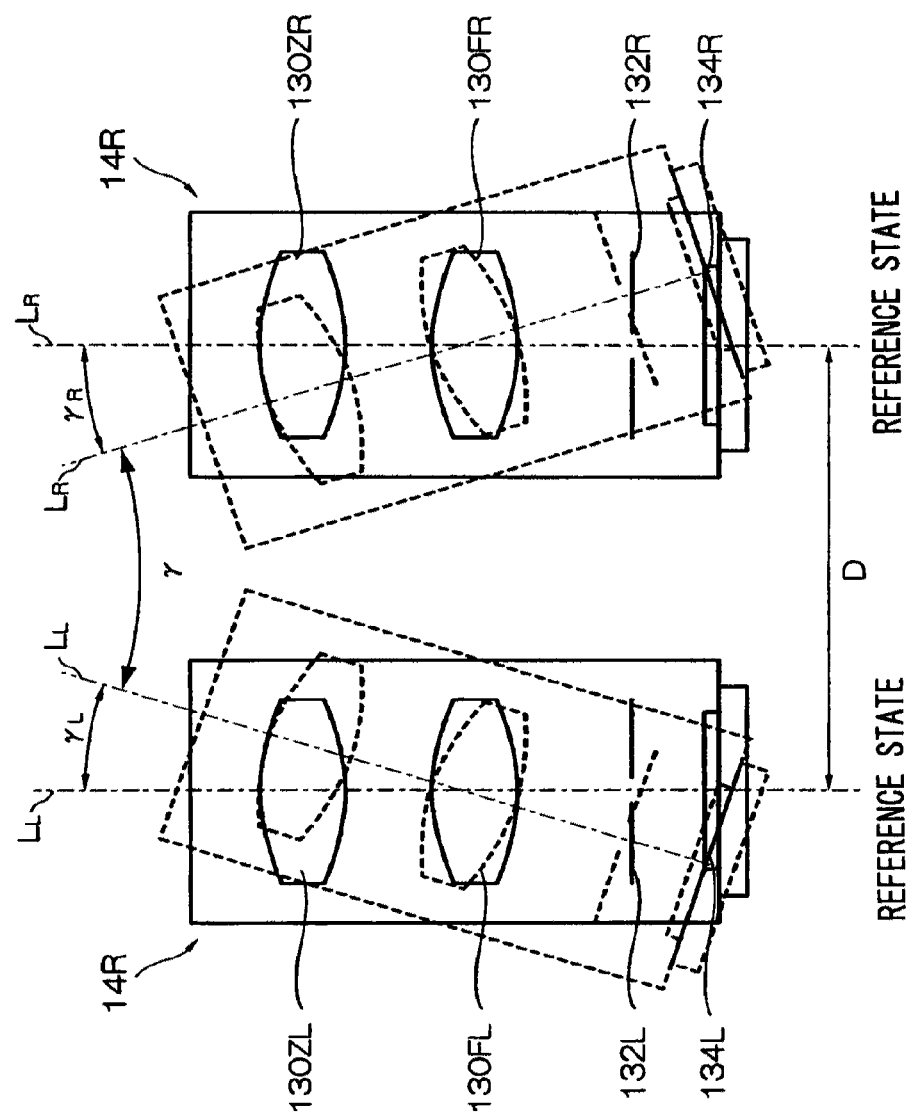
FIG. 9 is a diagram showing a method for detecting a shooting direction and a distance between optical axes of each photographing lens.

The tag information embedded is basically the same as that of the 2D still image data except that the tag information for the 3D still image data includes information on physical relationship of photographing lenses 14R and 14L setting, i.e., information on the distance D between the optical axes (=the base line length) of the photographing lenses 14R and 14L, and information on the shooting direction of the photographing lenses 14R and 14L, i.e., information on the directions of the optical axes $L_R$ and $L_L$ of the photographing lenses 14R and 14L are further included, as shown in FIG. 8.

Here, the directions of the optical axes $L_R$ and $L_L$ of the photographing lenses 14R and 14L are represented as tilt angle $\gamma_R$ ($\gamma$: gamma) and $\gamma_L$ against the optical axed $L_R$ and $L_L$ of the photographing lenses 14R and 14L when these axes are perpendicular to the front side of the camera body 12. The directions may be represented as the angle formed by the optical axis $L_R$ of the photographing lens 14R and the optical axis $L_L$ of the photographing lens 14L, i.e., a convergence angle $\gamma$, or both of the convergence angle and the tilt angle.

The digital camera 10 of the present embodiment has the photographing lenses 14R and 14L fixed to the camera body 12. Thus, the distance D between the photographing lenses 14R and 14L and the shooting direction are consistent. The shooting direction of both of the photographing lenses 14R and 14L is zero degree ($\gamma_R$=zero degree, $\gamma_L$=zero degree).

Information D on the distance (D) between the optical axes of the photographing lenses 14R and 14L and information on the shooting directions ($\gamma_R$, $\gamma_L$) are recorded in the ROM 116. The CPU 110 reads out the information recorded in the ROM 116 and obtains information on the distance D between the optical axes of the photographing lenses 14R and 14L and the shooting directions $\gamma_R$ and $\gamma_L$.

The tag information embedded in the image file also includes information on the attitude of the camera body 12 (tilt angle $\alpha$, $\beta$) when the camera is photographing as in the case of the 2D still image file.

Figure 10:
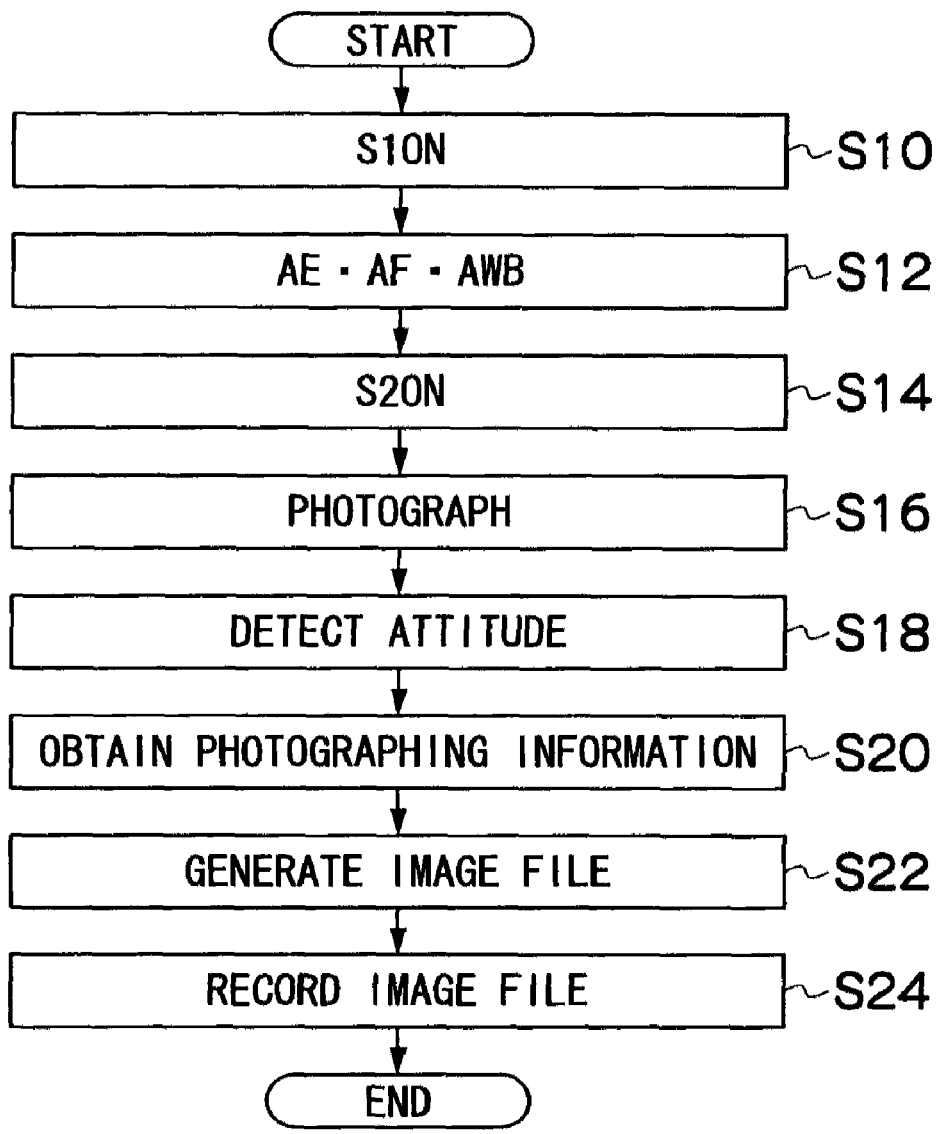
FIG. 10 is a flowchart showing photographing and recording procedures of a digital camera in a 3D still image photographing mode.

Therefore, the attitude (tilt angle $\alpha$, $\beta$) of the camera body 12 is also detected by the attitude detecting sensor 166 when the camera is photographing. Specifically, as shown in FIG. 10, in the 3D still image photographing mode, when the shutter button 18 is fully depressed (S2ON) (step S14), the photographing is executed (step S16), and the attitude of the camera body 12 is also detected (step S18). Then, information on photographing including the shutter speed, the aperture value, the distance (D) between the optical axes of the photographing lenses 14R and 14L, and the shooting directions ($\gamma_R$ and $\gamma_L$) are collected with information on the detected attitude of the camera body 12 (step S20), then an image file is generated based on the collected information (step S22), and the generated image file is recorded in the memory card 154 (step S24).

As mentioned above, in the 3D still image photographing mode, when a user fully-depresses the shutter button 18 as in the 2D moving image photographing mode, the image is recorded.

Here, the image data obtained by the photographing is recorded in the memory card 154 with information on the distance D between the optical axes of the photographing lenses 14R and 14L, the shooting directions $\gamma_R$ and $\gamma_L$, and the attitude of the camera body 12 (tilt angle $\alpha$, $\beta$) added as information on the photographing as well as information on the shutter speed, the aperture value and the like. With those kinds of information added, the image can be easily corrected to a straight image based on the information even if the image is photographed while the camera body 12 is tilted (the optical axes are tilted).

Figure 11A:
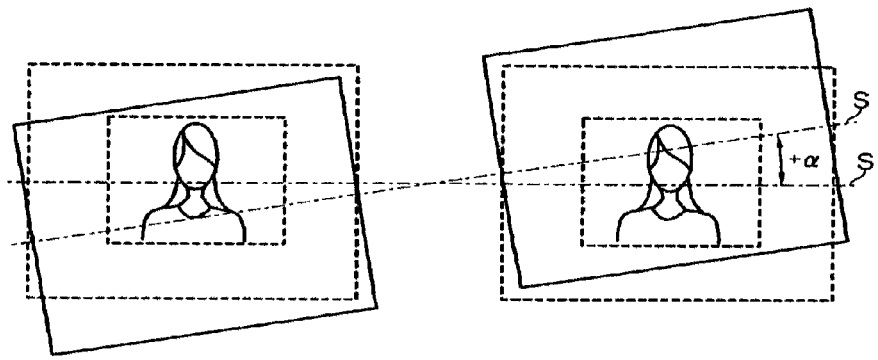
FIGS. 11A, 11B, 11C and 11D are diagrams for illustrating a method for correcting an image.

As shown in FIG. 11A, it is assumed that an image is photographed while a straight line S connecting the optical axes $L_R$ and $L_L$ of the pair of the photographing lenses 14R and 14L tilts against the horizon by +$\alpha$ (while the camera body 12 tilts horizontal direction by +$\alpha$).

Figure 11B:
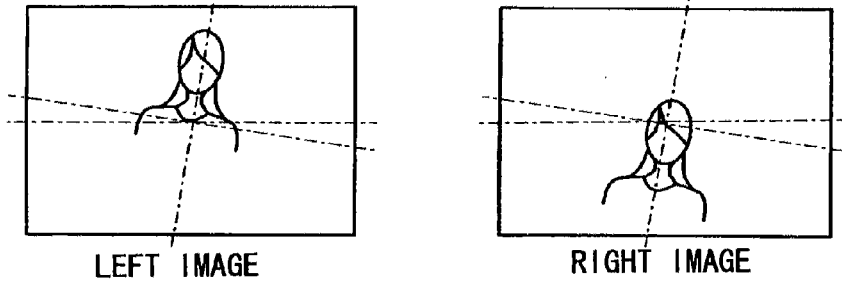

In such case, the image obtained by the photographing comes out as the image in which the subject tilts against the horizon (the bottom line or the top line of the image) by -$\alpha$ as shown in FIG. 11B.

The image photographed by the digital camera 10 of the present embodiment has information on the attitude of the camera body 12 while the camera is photographing and information on the tilt angle $\alpha$ against the horizon. With these kinds of information, the image can be corrected to a straight image.

Figure 11C:
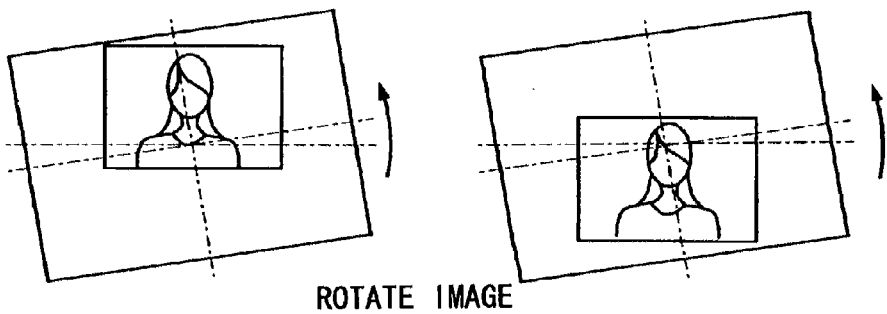

Specifically, as shown in FIG. 11C, the image obtained by the photographing is turned by +$\alpha$ and the image can be corrected to a straight image with a right attitude.

Figure 11D:

The image is produced with each side tilted as a result of the correction. Thus, the corresponding regions in left image and right image are trimmed into a rectangle so as to remove tilt from each side of the corrected images as shown in FIG. 11D.

When the 3D still image is to be photographed, the image is preferably photographed with a great number of recording pixels in consideration of the trimming after the photographing. If the image is recorded with the number of pixels less than that required, the image is preferably subjected to the zoom-up interpolation.

With information on the distance D between the optical axes of the photographing lenses 14R and 14L, the shooting directions $\gamma_R$ and $\gamma_L$, and the attitude of the camera body 12 (tilt angle $\alpha$ and $\beta$) added to the image data obtained by the photographing as mentioned above, a straight image can be easily obtained even after an image is photographed with the tilted camera body 12.

The case where an image is photographed with the camera body 12 horizontally tilted (where an image is photographed with the straight line S connecting the optical axes $L_R$ and $L_L$ of the pair of the photographing lenses 14r and 14L tilted against the horizon) has been described in the above example. In the case where an image is photographed with the camera body 12 is vertically tilted (where an image is photographed with the optical axes $L_R$ and $L_L$ of the photographing lenses 14R and 14L tilt against the horizon), or in the case where an image is photographed with the camera body 12 vertically and horizontally tilted, the image can be corrected to a straight image based on information added to the image data as mentioned above.

For example, when an image is photographed with the camera body 12 vertically tilted, required trapezoid correction is performed on the image based on information appended to the image data including the distance D between the optical axes of the photographing lenses 14R and 14L, the shooting directions $\gamma_R$ and $\gamma_L$, information on the attitude of the camera body 12 (tilt angle $\alpha$ and $\beta$), (and other appendix information if required) so that the image can be corrected to an straight image without any distortion.

When an image is photographed with the camera body 12 is horizontally tilted, trapezoid correction, rotation, trimming correction and the like are performed on the image based on the information appended to the image data including the distance D between the optical axes of the photographing lenses 14R and 14L, the shooting directions $\gamma_R$ and $\gamma_L$, information on the attitude of the camera body 12 (tilt angle $\alpha$ and $\beta$), (and other appendix information if required) so that the image can be corrected to a straight image without any tilt and distortion.

Now, operations of the digital camera 10 in the 3D moving image photographing mode will be described.

When the mode dial 22 is set to the 3D moving image position, the digital camera 10 enters into the 3D moving image photographing mode and enables the 3D moving image photographing.

When the mode dial 22 is set to the 3D moving image position and the power/mode switch 20 is set to the photographing position, the digital camera 10 starts in the 3D moving image photographing mode.

First, both of the left and right photographing lenses 14R and 14L come out to a predetermined photographing stand-by position, and the image captured by the image pickup devices 134R and 134L are displayed in live view mode on the monitor 24 (see FIG. 7).

The photographer decides the composition by viewing the live view image on the monitor 24, and directs the camera to start photographing. That is, the photographer fully depressed the shutter button 18.

When the shutter button 18 is fully depressed, the S1ON signal is inputted into the CPU 110. In response to the input of the S1ON signal, the CPU 110 performs photographing of a 3D moving image.

When a moving image is photographed, images are serially picked up at a predetermined frame rate. The images serially picked up by the image pickup devices 134R and 134L are serially applied to the digital signal processing units 142R and 142L via the analog signal processing units 138R and 138L, the A/D converters 140R and 140L, and the image input controllers 141R and 141L. The digital signal processing units 142R and 142L serially generates image data (Y/C image data) including brightness data Y and color difference data Cr and Cb by performing predetermined signal processing on the inputted image signal.

The generated image data is serially applied to the 3D image generating unit 150. The 3D image generating unit 150 generates 3D image data in a time division system from the inputted two series of image data from left and right.

The generated image data is serially applied to the compression/decompression unit 152, subjected to predetermined compression and serially stored in the SDRAM 120.

In order to finish photographing, the user fully-depresses the shutter button 18. When the shutter button 18 is fully-depressed, the S2ON signal is inputted to the CPU 110. In response to the input of the S2ON signal, the CPU 110 finishes the 3D moving image photographing.

When the photographing finishes, the CPU 110 generates an image file in a predetermined form (Motion JPEG form) that is the moving image data stored in the SDRAM 120 with the predetermined information added and records the image file in the memory card 156 via the medium controlling unit 154.

The image file is generated such that predetermined tag information related to the photographing is embedded in the top of the image data obtained by the photographing in the same manner as in the still image file.

The 3D moving image has been photographed. If the user wants to keep on photographing, the user repeats the processing mentioned above.

The 3D moving image recorded on the memory card 156 can be played on the monitor as the mode of the digital camera 10 is set to the play mode in the same manner as in the 2D moving image.

In such a case, when the power/mode switch 20 is set to the playing position and the mode of the digital camera 10 is set to playing mode, an image of the top frame of the moving image is displayed on the monitor 24. If the user directs the camera to play (for example, if the user presses the MENU/OK button 30) here, the moving image data is read out from the memory card 156, subjected to predetermined playing processing and outputted to the monitor 24. As a result, the 3D moving image recorded in the memory card 156 is played on the monitor.

As mentioned above, in the 3D moving image photographing mode, when the user fully-depresses the shutter button 18, the photographing starts. When the user half-depresses the shutter button 18 again, the photographing finishes (the camera can also be adapted to photograph a moving image while the user fully-depresses the shutter button 18 again, and when the user releases the fully-depression, the photographing finishes according to the setting).

The image data obtained by the photographing is recorded in the memory card 154 as an image file in a predetermined form with tag information related to predetermined photographing.

The tag information added to the image data includes information on the physical relationship among the photographing lenses 14R and 14L setting, i.e., information on the distance (=base line length) D between optical axes of the photographing lenses 14R and 14L, information on the shooting directions of photographing lenses 14R and 14L, i.e., information on the orientation of the optical axes $L_R$ and $L_L$ of the photographing lenses 14R and 14L, information on the attitude of the camera body 12 (tilt angle $\alpha$ and $\beta$).

Here, the digital camera 10 of the embodiment has photographing lenses 14R and 14L fixed. Thus, the distance (D) between the optical axes and the shooting directions ($\gamma_R$ and $\gamma_L$) are constant but the attitude of the camera body 12 (tilt angle $\alpha$ and $\beta$) are always changing. The attitude of the camera body 12 (tilt angle $\alpha$ and $\beta$) is continuously or intermittently detected and the information on that is recorded. The attitude is detected in sync with capturing of images (frame rate) and the attitude is recorded, for example.

With those kinds of information added, an image can be easily corrected to the straight image without any tilt and distortion after the photographing even if the image is photographed with the camera body 12 tilted as in the case of the 3D still image mentioned above. As tilt and distortion are corrected on each frame, the entire moving image is corrected to an image without tilt and distortion. As a result, a high quality 3D moving image can be obtained.

As mentioned above, the digital camera 10 of the embodiment adds photographing information including information on the physical relationship among the photographing lenses 14R and 14L setting (information on the distance=base line length) D between optical axes of the photographing lenses 14R and 14L), and information on the shooting directions of photographing lenses 14R and 14L (information on the orientation of the optical axes $L_R$ and $L_L$ of the photographing lenses 14R and 14L), and information on the attitude of the camera body 12 (left and right tilt angle $\alpha$, and the vertical tilt angle β of the camera body 12). Thus, A high quality 3D moving image can be obtained as tilt and distortion are corrected on each frame and the entire moving image is corrected to an image without tilt and distortion, even if an image is photographed with the camera body 12 tilted.

Although the digital camera 10 of the embodiment is adapted to record a tilt angle α of the straight line S connecting the optical axes $L_R$ and $L_L$ of the pair of the photographing lenses 14R and 14L against the horizon (so-called the rotation angle around the optical axes=the left and right tilt angle of the camera body 12) and a tilt angle β of the optical axes $L_R$ and $L_L$ of the pair of the photographing lenses 14R and 14L (so-called vertical tilt angle of the optical axes=the vertical tilt angle of the camera body 12) as information on the attitude of the camera body 12, the digital camera may be further adapted to record the horizontal direction tilt angle of the optical axes $L_R$ and $L_L$ of the pair of the photographing lenses 14R and 14L.

Although the digital camera of the embodiment is adapted to add information on the physical relationship among the photographing lenses 14R and 14L, information on the shooting directions of the photographing lenses 14R and 14L setting, and information on the attitude of the camera body 12 to the image data obtained by the photographing, the digital camera may be adapted to add information for correcting the tilt, distortion and the like of the image to the image data in addition to or in the place of those kinds of information. Specifically, the digital camera may be adapted to calculate the amount of correction for correcting the tilt, distortion and the like of an image based on the information on the physical relationship between the photographing lenses 14R and 14L setting, information on the shooting directions of the photographing lenses 14R and 14L and information on the attitude of the camera body 12 and add the calculated result to the image data obtained by the photographing in addition to or in the place of those kinds of information. In the example shown in FIG. 11, the information α on the amount of rotation for correcting the tilt and information on the trimming may be added.

Therefore, in the case of the 3D still image photographing mode, as shown in FIG. 12, when the shutter button 18 is fully-depressed (step S14), the photographing is performed (step S16), and the attitude of the camera body 12 is detected (step S18), information on the photographing including the shutter speed and the aperture value, the distance (D) between the optical axes of the photographing lenses 14R and 14L, and the shooting directions ($\gamma_R$ and $\gamma_L$) and so on, is collected as well as information on the detected attitude of the camera body 12 (step S20), and the amount of correction for correcting the tilt and distortion of the image is calculated based on the collected information (step S21). Then, an image file with the information on the calculated amount of correction and information on the photographing added is generated (step S22), and the image file is recorded in the memory card 154 (step S24).

The camera may be adapted to record an image having the tilt, distortion and the like corrected in the memory card 154 instead of adding the information on the amount of correction for correcting the tilt, distortion and the like of the image to the image file. Specifically, the camera may be adapted to correct the image obtained by the photographing based on the calculated result and record the corrected image in the memory card 154 as the image obtained by the photographing. In the examples shown in FIG. 11, the image with the tilt corrected (FIG. 11C), or the trimmed image (FIG. 11D) may be recorded in the memory card 154 as the image obtained by the photographing.

Therefore, in the case of the 3D still image photographing mode, as shown in FIG. 13, when the shutter button 18 is fully-depressed (step S14), the photographing is performed (step S16), and the attitude of the camera body 12 is detected (step S18), information on the photographing including the shutter speed and the aperture value, the distance (D) between the optical axes of the photographing lenses 14R and 14L, and the shooting directions ($\gamma_R$ and $\gamma_L$) and so on, is collected as well as information on the detected attitude of the camera body 12 (step S20), and the amount of correction for correcting the tilt and distortion of the image is calculated based on the collected information (step S21) and the image obtained by the photographing is corrected based on the information on the calculated amount of correction (step S21'). Then, the information on the photographing is added to the corrected image so as to generate an image file (step S22), and the image file is recorded in the memory card 154 (step S24).

Both of the original image (the image obtained by the photographing) and the corrected image may be recorded in the memory card. In such a case, information on the physical relationship between the photographing lenses 14R and 14L setting, information on the shooting directions of the photographing lenses 14R and 14L and information on the attitude of the camera body 12 are added to the original image. Alternatively, the information for correcting the tilt, the distortion and the like of the image is added in addition to or instead of the information.

As the image correction takes time, the camera may be adapted to automatically switch whether the image correction is needed or not according to the mode. In the continuous-shooting mode, two or more images need to be continuously processed. Then, the camera forbids the correction and records only the original image with predetermined information added in the memory card.

When both of the original image and the corrected image are recorded, the images may occupy too much capacity of the memory card 154. Then, the camera may be adapted to automatically switch whether the correction is needed or not according to the free space of the memory card 154. When the free space of the memory card 154 is reduced lower than a preset threshold, the camera forbids the correction and records only the original image with predetermined information in the memory card.

It is preferable that the camera is adapted to allow a user to arbitrary adjust those settings.

Although the digital camera 10 of the embodiment is adapted to embed the information on the physical relationship of the photographing lenses 14R and 14L setting, the information on the shooting directions of the photographing lenses 14R and 14L, and the information on the attitude of the camera body 12 in a header part of the image file as tag information, the camera may be adapted to generate a file containing those kinds of information separately (as a photographing information file), associate the file with the image file of the image data obtained by the photographing and record the files in the memory card 154. In such a case, the camera may be adapted to generate the photographing information file for each image file, or record information on two or more image files in a photographing information file en bloc.

Although the digital camera 10 of the embodiment is adapted to combine images obtained from left and right photographing series and record them as an image in the memory card 154 in photographing the 3D still image, the system for recording images is not limited to that. The camera may be adapted to associate the images obtained from the left and right photographing series with each other and record the images separately. In such a case, the abovementioned predetermined information is added to each image data.

The camera may also be adapted to associate the image data obtained from the left and right photographing series with each other and record them separately in the memory card 154 in photographing the 3D moving image.

Although the digital camera of the embodiment uses the Motion JPEG form as a form of the 3D moving image file, the file form of the 3D moving image is not limited to that and the MPEG (MPEG: Moving Picture Experts Group) form may be used in recording.

Although the abovementioned embodiment have been described in a case where the present invention is applied to a digital camera with two viewpoints including two series of photographing, the present invention is not limited to be applied to that kind of digital camera and may also be applied to a 3D photographing system with multi viewpoints.

Although the present invention is applied to a digital camera whose left and right photographic optical systems separately have image pickup devices (so-called two camera system) in the abovementioned example, the present invention is not limited to be applied to that kind of digital camera, and may also be applied to a digital camera that photographs an image obtained from the left and right series of photographing with one image pickup system (so-called one camera system).

FIG. 14 is a plan view showing a configuration of a substantial part of the second embodiment of the digital camera to which the present invention is applied.

As shown in FIG. 14, the digital camera of the embodiment is adapted to have the photographing lenses 14R and 14L horizontally movable and their setting positions adjustable. Specifically, the digital camera is adapted to adjust the base line length D (with the shooting directions fixed).

As the digital camera of second embodiment is the same as that of the first embodiment except that the digital camera of the second embodiment can adjust the base line length D, only the mechanism for adjusting the base line length will be described here.

As shown in FIG. 14, the photographing lenses 14R and 14L have the image pickup devices 134R and 134L attached to the rear anchor parts of the lens tubes 15R and 15L of the lenses. The image pickup devices 134R and 134L are arranged on the optical axes $L_R$ and $L_L$ of the photographing lenses 14R and 14L respectively.

The photographing lenses 14R and 14L with the image pickup devices 134R and 134L integrated respectively are horizontally set on the slide stages 200R and 200L respectively. The slide stages are provided on a horizontally laid rail 202 so that they can slide along there. The rail 202 is horizontally laid on a base plate 204. The base plate 204 is horizontally attached to the body frame of the digital camera (not shown) (the base plate 204 is attached in parallel with the top surface and the bottom surface of the camera body 12).

The slide stages 200R and 200L are driven by a driving device (no shown) (e.g., a linear motor or a ball screw mechanism and the like) and slide on the rail 202. Here, the driving device moves the left and right slide stages 200R and 200L toward each other or apart from each other by the same distance (move them toward each other or apart from each other at either side of the central axis X of the base plate 204 by the same distance). Thus, the distances $D_R$ and $D_L$ between the respective optical axes $L_R$ and $L_L$ of the photographing lenses 14R and 14L and the central axis X of the base plate 204 always takes the same value ($D_R=D_L$, $D=D_R+D_L$).

The distance between the optical axes $L_R$ and $L_L$ of the photographing lenses 14R and 14L increases or decreases as the driving device slides on the slide stages 200R and 200L. That changes the base line length D. The CPU 110 controls driving of the driving device of the slide stages 200R and 200L via the controlling device (not shown) and adjusts the base line length D.

The origin positions (the origins of the movement) are defined for the left and right slide stages 200R and 200L. The CPU 110 adjusts the base ling length D by indicating the movement amount for each of the left and right origins of the movement to the controlling device.

As mentioned above, the digital camera of the embodiment can adjust the base line length D of each of the photographing lenses 14R and 14L with the shooting directions fixed.

As a result, information on the set base line length D is added to the image data photographed in each mode and recorded in the memory card 154. That facilitates correction of a tilt, distortion and the like of the photographed image even if the base line length D changes. Accordingly, the user can obtain a high quality image in a simple manner.

The embodiment may also be adapted to calculate the amount of correction for correcting a tilt, distortion and the like of an image based on information on the set base line length D and the like, adds the information on the amount of correction to the image data, and record them in the memory card 154 as in the case of the digital camera of the abovementioned embodiment. Alternatively, the photographed image may be corrected based on the information on the correction amount, and the corrected image may be recorded on the memory 154.

As the distance between the left and right origins of the movement is known, the CPU 110 detects the set base line length D by adding or subtracting the indicated movement amount to or from the distance between the left and right origins of the movement.

Alternatively, the digital camera may be adapted to have a device which detects the base line length D, i.e., a device which detects a distance between the optical axes $L_R$ and $L_L$ of the photographing lenses 14R and 14L separately for detecting the base line length by using the detecting device in photographing an image, adding information on the detected base line D to the image data obtained by the photographing and recording them in the memory card 154.

Figure 15:
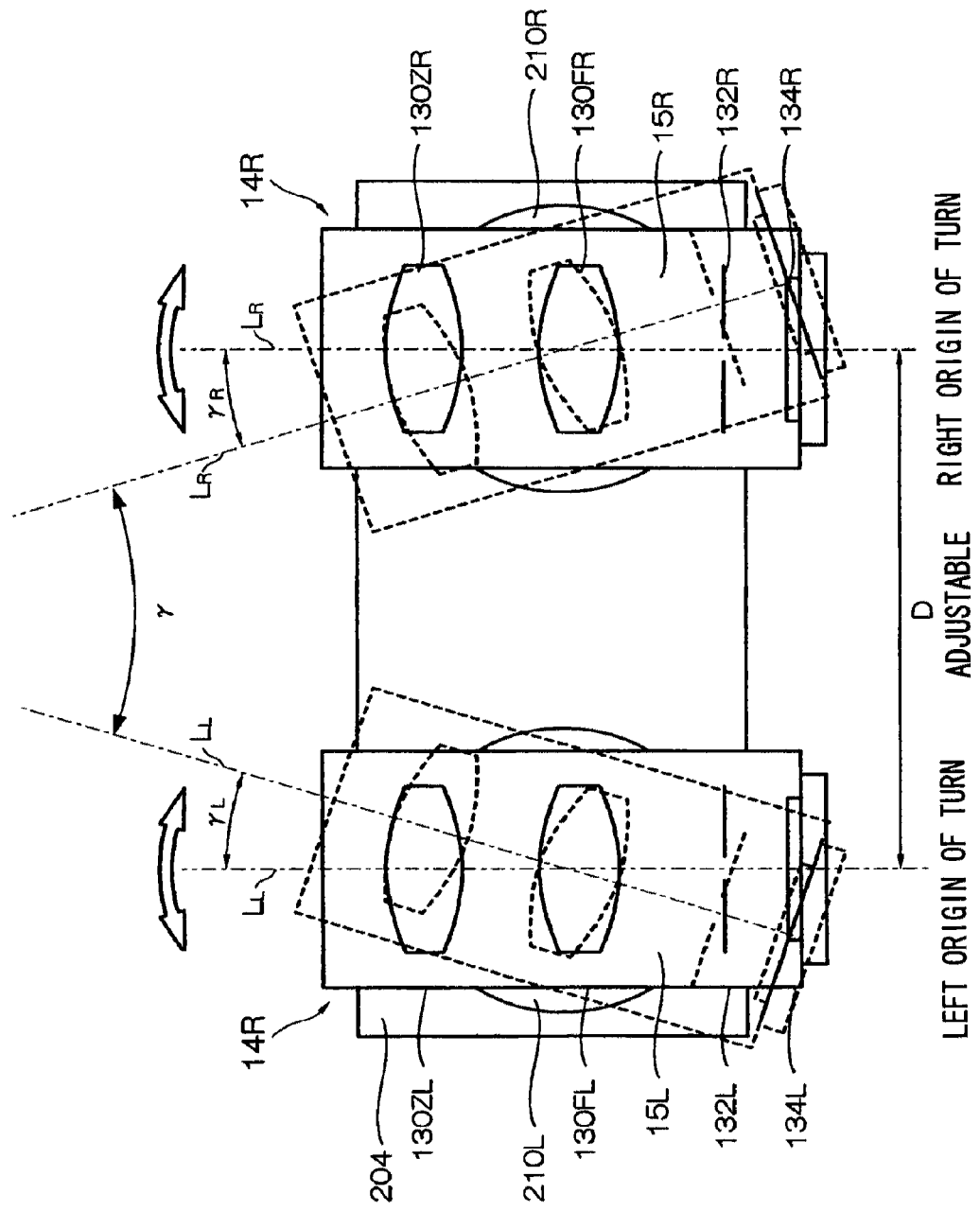
FIG. 15 is a plan view showing a configuration of a substantial part of a third embodiment of the digital camera to which the present invention is applied.

FIG. 15 is a plan view showing a configuration of a substantial part of the third embodiment of the digital camera to which the present invention is applied.

As shown in FIG. 15, the digital camera of the embodiment is adapted to have the photographing lenses 14R and 14L turn so that the shooting direction (the orientation of the optical axes $L_R$ and $L_L$), i.e., a convergence angle (an angle formed by the optical axes $L_R$ and $L_L$ of the photographing lenses 14R and 14L) γ can be adjusted (with the setting position fixed).

As the digital camera of the third embodiment is the same as that of the first embodiment except that the digital camera of the third embodiment can adjust the convergence angle, only the mechanism for adjusting the convergence angle will be described here.

As shown in FIG. 15, the photographing lenses 14R and 14L have the image pickup devices 134R and 134L attached to the rear anchor parts of the lens tubes 15R and 15L of the lenses. The image pickup devices 134R and 134L are arranged on the optical axes $L_R$ and $L_L$ of the photographing lenses 14R and 14L respectively.

The photographing lenses 14R and 14L with the image pickup devices 134R and 134L integrated respectively are horizontally set on the turn stages 210R and 210L respectively. The turn stages 210R and 210L are provided on a horizontally attached base plate 204 via a bearing (not shown)

so that they can turn there. The base plate 204 is horizontally attached to the body frame of the digital camera (not shown) (the base plate 204 is attached in parallel with the top surface and the bottom surface of the camera body 12).

The turn stages 210R and 210L are driven by turn driving devices (not shown) (e.g., motors and the like) and turn on a predetermined position on the base plate 204.

The turn driving devices for turning the left and right turn stages 210R and 210L are driven in sync with each other and turns the turn stages 210R and 210L in directions reverse to each other by the same angle (turns the photographing lenses 14R and 14L with their tips apart from each other or toward each other).

As the turn driving device drives the turn stages 210R and 210L, the orientations of the optical axes $L_R$ and $L_L$ of the photographing lenses 14R and 14L change and the convergence angle γ changes.

The CPU 110 controls driving of the turn driving device of the turn stages 210R and 210L via the controlling device (not shown) and adjusts the convergence angle γ.

The origin positions (the origins of the turn) are defined for the left and right turn stages 210R and 210L. The CPU 110 adjusts the convergence angle γ by indicating the turning amount from the origins of the turn to the controlling device. The left and right origins of the turn are the positions where the optical axes $L_R$ and $L_L$ of the left and right photographing lenses 14 are orthogonal to the front side of the camera body 12.

As mentioned above, the digital camera of the embodiment can adjust the convergence angle γ of the photographing lenses 14R and 14L fixed to predetermined positions.

As a result, information on the set convergence angle γ is added to the image data photographed in each mode and recorded in the memory card 154. That facilitates correction of a tilt, distortion and the like of the photographed image even if the convergence angle γ changes. Accordingly, the user can obtain a high quality image in a simple manner.

The embodiment may also be adapted to calculate the amount of correction for correcting a tilt, distortion and the like of an image based on information on the set convergence angle γ, adds the information on the amount of correction to the image data, and record them in the memory card 154 as in the case of the digital camera of the abovementioned embodiment. The embodiment may also be adapted to correct the photographed image based on the information on the calculated amount of correction and record the corrected image data in the memory card 154.

As the orientations of the optical axes of the photographing lenses 14R and 14L when they are placed at the left and right origins of turn are known, the CPU 110 detects the set convergence angle γ by calculating the convergence angle γ based on the amount of turn from the left and right origins of turn.

Alternatively, the digital camera may be adapted to have a device which detects the convergence angle γ, i.e., a device which detects an angle between the optical axes $L_R$ and $L_L$ of the left and right photographing lenses 14R and 14L separately for detecting the convergence angle γ by using the detecting device in photographing an image, adding information on the detected convergence angle γ to the image data obtained by the photographing and record them in the memory card 154.

Figure 16:
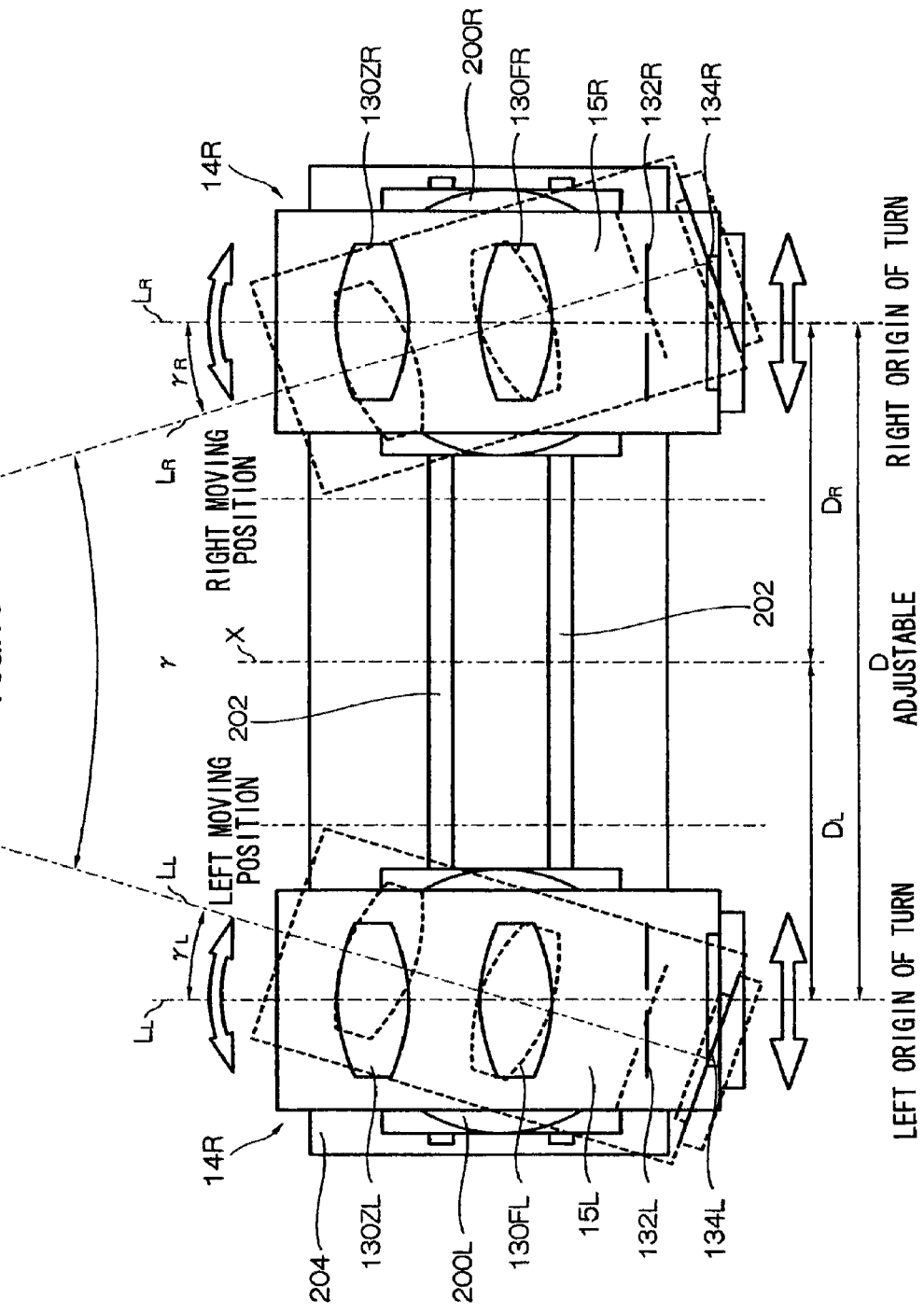
FIG. 16 is a plan view showing a configuration of a substantial part of a fourth embodiment of the digital camera to which the present invention is applied.

FIG. 16 is a plan view showing a configuration of a substantial part of the fourth embodiment of the digital camera to which the present invention is applied.

As shown in FIG. 16, the digital camera of the embodiment is adapted to have the photographing lenses 14R and 14L horizontally move and turn so that the setting positions and the shooting directions can be adjusted. Specifically, the digital camera is adapted to adjust the base line length D and the convergence angle γ.

As the digital camera of fourth embodiment is the same as that of the first embodiment except that the digital camera of the fourth embodiment can adjust the base line length and the convergence angle, only the mechanism for adjusting the convergence angle will be described here.

As shown in FIG. 16, the photographing lenses 14R and 14L have the image pickup devices 134R and 134L attached to the rear anchor parts of the lens tubes 15R and 15L of the lenses. The image pickup devices 134R and 134L are arranged on the optical axes $L_R$ and $L_L$ of the photographing lenses 14R and 14L respectively.

The photographing lenses 14R and 14L with the image pickup devices 134R and 134L integrated respectively are horizontally set on the turn stages 210R and 210L respectively. The turn stages 210R and 210L are provided on slide stages 200R and 200L via a bearing (not shown) so that they can turn there.

The slide stages 200R and 200L are provided on a horizontally laid rail 202 so that they can slide along there. The rail 202 is horizontally laid on a base plate 204. The base plate 204 is horizontally attached to the body frame of the digital camera (not shown) (the base plate 204 is attached in parallel with the top surface and the bottom surface of the camera body 12).

The slide stages 200R and 200L are driven by a driving device (no shown) (e.g., a linear motor or a ball screw mechanism and the like) and slide on the rail 202. Here, the driving device moves the left and right slide stages 200R and 200L toward each other or apart from each other by the same distance (move them toward each other or apart from each other at either sides of the central axis X of the base plate 204 by the same distance). Thus, the distances $D_R$ and $D_L$ between the respective optical axes $L_R$ and $L_L$ of the photographing lenses 14R and 14L and the central axis X of the base plate 204 always takes the same value ($D_R=D_L$, $D=D_R+D_L$).

The distance between the optical axes $L_R$ and $L_L$ of the photographing lenses 14R and 14L increases or decreases as the driving device slides on the slide stages 200R and 200L. That changes the base line length D. The CPU 110 controls driving of the driving device of the slide stages 200R and 200L via the controlling device (not shown) and adjusts the base line length D.

The origins of the movement are defined for the left and right slide stages 200R and 200L. The CPU 110 adjusts the base ling length D by indicating the movement amount from the origins of the movement to the controlling device.

The turn stages 210R and 210L are driven by turn driving devices (not shown) (e.g., motors and the like) and turn the slide stages 200R and 200L.

The turn driving devices for turning the left and right turn stages 210R and 210L are driven in sync with each other and turn the turn stages 210R and 210L in directions reverse to each other by the same angle (turns the photographing lenses 14R and 14L with their tips apart from each other or toward each other).

As the turn driving device drives the turn stages 210R and 210L, the orientations of the optical axes $L_R$ and $L_L$ of the photographing lenses 14R and 14L change and the convergence angle γ changes.

The CPU 110 controls driving of the turn driving device of the turn stages 210R and 210L via the controlling device (not shown) and adjusts the convergence angle γ.

The origin positions are defined for the left and right turn stages 210R and 210L. The CPU 110 adjusts the convergence angle γ by indicating the turning amount from the origins of the turn to the controlling device. The origins of the turn are the positions where the optical axes $L_R$ and $L_L$ of the left and right photographing lenses 14 are orthogonal to the front side of the camera body 12.

As mentioned above, the digital camera of the embodiment can adjust the base line length D and the convergence angle γ of the photographing lenses 14R and 14L fixed to predetermined positions.

As a result, information on the set base line length D and the convergence angle γ is added to the image data photographed in each mode and recorded in the memory card 154. That facilitates correction of a tilt, distortion and the like of the photographed image even if the base line length D and the convergence angle γ change. Accordingly, the user can obtain a high quality image in a simple manner.

The embodiment may also be adapted to calculate the amount of correction for correcting a tilt, distortion and the like of an image based on information on the set base line length D and the convergence angle γ, adds the information on the amount of correction to the image data, and record them in the memory card 154 as in the case of the digital camera of the abovementioned embodiments. The embodiment may also be adapted to correct the photographed image based on the information on the calculated amount of correction and record the corrected image data in the memory card 154.

As mentioned above, according to the present invention, the 3D image data is recorded in a recording medium with information on the attitude of the camera when the camera is photographing an image, information on the base line length and the convergence angle and the like added to facilitate correction of a tilt of the photographed image. Accordingly, the user can obtain a high quality stereographic image in a simple manner. Also, according to the present invention, the amount of correction required for performing correction and the like of a tilt of the image is calculated from the information on the attitude of the camera obtained when the camera is photographing an image and the information on the base line length and the convergence angle, and the amount of the correction is recorded in the recording medium with the image data obtained by the photographing added to facilitate correction and the like of a tilt of the image in a simpler manner. Accordingly, the user can obtain a high quality stereographic image in a simpler manner. The present invention also automatically corrects an image and records the image in the recording medium. That provides a user with a high quality stereographic image in a simple manner.

Although the abovementioned embodiments have been described by taking an example where the present invention is applied to a compact type 3D camera, the present invention is not limited to be applied to that kind of camera and may be applied to various kinds of photographing apparatus for photographing stereographic images.

What is claimed is:

1. Photographing apparatus which photographs a stereographic image based on an instruction of actual photographing, and whose apparatus body includes left and right photographic optical systems set at predetermined positions of the apparatus body with their shooting directions fixed, and left and right image pickup devices that photograph the subject formed on the photo receiving surfaces by each of the photographic optical systems comprising:

an attitude detecting device which detects an attitude of the apparatus body;

a physical relationship information obtaining device which obtains information on a physical relationship among the photographic optical systems setting;

a shooting direction information obtaining device which obtains information on the shooting direction of each of the photographic optical systems;

a correction amount calculating device which calculates an amount of correction for correcting an image photographed by each of the image pickup devices via each of the photographic optical systems to a predetermined attitude based on each information obtained by collecting information on the attitude of the apparatus body obtained from the attitude detecting device, the information on the physical relationship among the photographic optical systems setting obtained from the physical relationship information obtaining device, and the information on the shooting direction of each of the photographic optical systems obtained from the shooting direction information obtaining device based on the instruction of actual photographing; and a record controlling device which records the image photographed by each of the image pickup devices via each of the photographic optical systems on a recording medium with information on the amount of correction calculated by the correction amount calculating device added based on the instruction of actual photographing.

2. Photographing apparatus which photographs a stereographic image based on an instruction of actual photographing and whose apparatus body includes left and right photographic optical systems set at predetermined positions of the apparatus body with their shooting directions adjustable, and left and right image pickup devices that photograph the subject formed on the photo receiving surfaces by each of the photographic optical systems comprising:

an attitude detecting device which detects an attitude of the apparatus body;

a physical relationship information obtaining device which obtains information on a physical relationship among the photographic optical systems setting;

a shooting direction detecting device which detects a shooting direction of each of the photographic optical systems;

a correction amount calculating device which calculates an amount of correction for correcting an image photographed by each of the image pickup devices via each of the photographic optical systems to a predetermined attitude based on each information obtained by collecting information on the attitude of the apparatus body obtained from the attitude detecting device, the information on the physical relationship among the photographic optical systems setting obtained from the physical relationship information obtaining device, and information on the shooting direction of each of the photographic optical systems obtained from the shooting direction detecting device based on the instruction of actual photographing; and a record controlling device which records the image photographed by each of the image pickup devices via each of the photographic optical systems on a recording medium with information on the amount of correction calculated by the correction amount calculating device added based on the instruction of actual photographing.

3. Photographing apparatus which photographs a stereographic image based on an instruction of actual photographing and whose apparatus body includes left and right photographic optical systems on the apparatus body with their shooting directions fixed and their setting positions adjustable, and left and right image pickup devices that photographs the subject formed on the photo receiving surfaces by each of the photographic optical systems comprising:

an attitude detecting device which detects an attitude of the apparatus body;

a setting position detecting device which detects a setting position of each of the photographic optical systems;

a shooting direction information obtaining device which obtains information on the shooting direction of each of the photographic optical systems;

a correction amount calculating device which calculates an amount of correction for correcting an attitude of an image photographed by each of the image pickup devices via each of the photographic optical systems to a predetermined attitude based on each information obtained by collecting information on the attitude of the apparatus body obtained from the attitude detecting device, information on physical relationship among the photographic optical systems setting obtained from the setting position detecting device, and the information on the shooting direction of each of the photographic optical systems obtained from the shooting direction information obtaining device; based on the instruction of actual photographing and a record controlling device which records the image photographed by each of the image pickup devices via each of the photographic optical systems on a recording medium with information on the amount of correction calculated by the correction amount calculating device added based on the instruction of actual photographing.

4. Photographing apparatus which photographs a stereographic image based on an instruction of actual photographing and whose apparatus body includes left and right photographic optical systems on the apparatus body with their setting positions and shooting directions adjustable and left and right image pickup devices that photograph the subject formed on the photo receiving surfaces by each of the photographic optical systems, comprising:

an attitude detecting device which detects an attitude of the apparatus body;

a setting position detecting device which detects a setting position of each of the photographic optical systems;

a shooting direction detecting device which detects a shooting direction of each of the photographic optical systems;

a correction amount calculating device which calculates an amount of correction for correcting an image photographed by each of the each image pickup devices via each of the photographic optical systems to a predetermined attitude based on each information obtained by collecting information on the attitude of the apparatus body obtained from the attitude detecting device, information on physical relationship among the photographic optical systems setting obtained from the setting position detecting device, and information on the shooting direction of each of the photographic optical systems obtained from the shooting direction detecting device based on the instruction of actual photographing; and a record controlling device which records the image photographed by each of the image pickup devices via each of the photographic optical systems on a recording medium with information on the amount of correction calculated by the correction amount calculating device added.

5. The photographing apparatus according to claim 1, wherein
the record controlling device adds each information collected by the correction amount calculating device together with the information on the amount of correction on the photographed image and records on a recording medium.

6. The photographing apparatus according to claim 2, wherein
the record controlling device adds each information collected by the correction amount calculating device together with the information on the amount of correction on the photographed image and records on a recording medium.

7. The photographing apparatus according to claim 3, wherein
the record controlling device adds each information collected by the correction amount calculating device together with the information on the amount of correction on the photographed image and records on a recording medium.

8. The photographing apparatus according to claim 4, wherein
the record controlling device adds each information collected by the correction amount calculating device together with the information on the amount of correction on the photographed image and records on a recording medium.

9. The photographing apparatus according to claim 1, further comprising
an image correcting device that corrects the image photographed with each of the image pickup devices via each of the photographic optical systems based on the calculated result of the correction amount calculating device, wherein
the record controlling device adds the information on the amount of correction calculated by the correction amount calculating device on the image photographed by each of the image pickup devices via each of the photographic optical systems, records on the recording medium, and records corrected images corrected by the image correction device on the recording medium.

10. The photographing apparatus according to claim 2 further comprising
an image correcting device that corrects the image photographed with each of the image pickup devices via each of the photographic optical systems based on the calculated result of the correction amount calculating device, wherein
the record controlling device adds the information on the amount of correction calculated by the correction amount calculating device on the image photographed by each of the image pickup devices via each of the photographic optical systems, records on the recording medium, and records corrected images corrected by the image correction device on the recording medium.

11. The photographing apparatus according to claim 3 further comprising
an image correcting device that corrects the image photographed with each of the image pickup devices via each of the photographic optical systems based on the calculated result of the correction amount calculating device, wherein
the record controlling device adds the information on the amount of correction calculated by the correction amount calculating device on the image photographed by each of the image pickup devices via each of the photographic optical systems, records on the recording medium, and records corrected images corrected by the image correction device on the recording medium.

12. The photographing apparatus according to claim 4 further comprising
- an image correcting device that corrects the image photographed with each of the image pickup devices via each of the photographic optical systems based on the calculated result of the correction amount calculating device, wherein
- the record controlling device adds the information on the amount of correction calculated by the correction amount calculating device on the image photographed by each of the image pickup devices via each of the photographic optical systems, records on the recording medium, and records corrected images corrected by the image correction device on the recording medium.

13. The photographing apparatus according to claim 9, wherein the image correcting device does not perform the correction processing when a free space of the recording medium is reduced lower than a preset threshold, wherein
- the record controlling device adds the information on the amount of correction calculated by the correction amount calculating device on the image photographed by each of the image pickup devices via photographing optical systems and records on the recording medium.

14. The photographing apparatus according to claim 10, wherein the image correcting device does not perform the correction processing when a free space of the recording medium is reduced lower than a preset threshold, wherein
- the record controlling device adds the information on the amount of correction calculated by the correction amount calculating device on the image photographed by each of the image pickup devices via photographing optical systems and records on the recording medium.

15. The photographing apparatus according to claim 11, wherein the image correcting device does not perform the correction processing when a free space of the recording medium is reduced lower than a preset threshold, wherein
- the record controlling device adds the information on the amount of correction calculated by the correction amount calculating device on the image photographed by each of the image pickup devices via photographing optical systems and records on the recording medium.

16. The photographing apparatus according to claim 12, wherein the image correcting device does not perform the correction processing when a free space of the recording medium is reduced lower than a preset threshold, wherein
- the record controlling device adds the information on the amount of correction calculated by the correction amount calculating device on the image photographed by each of the image pickup devices via photographing optical systems and records on the recording medium.

17. The photographing apparatus according to claim 9, wherein the image correcting device does not perform correction processing when a mode of the photographing apparatus is set to a continuous-shooting mode, wherein,
- the record controlling device adds the information on the amount of correction calculated by the correction amount calculating device on the image photographed by each of the image pickup devices via photographing optical systems and records on the recording medium.

18. The photographing apparatus according to claim 10, wherein the image correcting device does not perform correction processing when a mode of the photographing apparatus is set to a continuous-shooting mode, wherein,
- the record controlling device adds the information on the amount of correction calculated by the correction amount calculating device on the image photographed by each of the image pickup devices via photographing optical systems and records on the recording medium.

19. The photographing apparatus according to claim 11, wherein the image correcting device does not perform correction processing when a mode of the photographing apparatus is set to a continuous-shooting mode, wherein,
- the record controlling device adds the information on the amount of correction calculated by the correction amount calculating device on the image photographed by each of the image pickup devices via photographing optical systems and records on the recording medium.

20. The photographing apparatus according to claim 12, wherein the image correcting device does not perform correction processing when a mode of the photographing apparatus is set to a continuous-shooting mode, wherein,
- the record controlling device adds the information on the amount of correction calculated by the correction amount calculating device on the image photographed by each of the image pickup devices via photographing optical systems and records on the recording medium.

* * * * *